United States Patent
Shapira et al.

(10) Patent No.: US 9,898,864 B2
(45) Date of Patent: Feb. 20, 2018

(54) SHARED TACTILE INTERACTION AND USER SAFETY IN SHARED SPACE MULTI-PERSON IMMERSIVE VIRTUAL REALITY

(71) Applicant: Microsoft Technology Licensing, LLC, Redmond, WA (US)

(72) Inventors: Lior Shapira, Redmond, WA (US); Ran Gal, Redmond, WA (US); Douglas Christopher Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 14/724,503

(22) Filed: May 28, 2015

(65) Prior Publication Data

US 2016/0350973 A1  Dec. 1, 2016

(51) Int. Cl.
*G09G 5/00* (2006.01)
*G06T 19/00* (2011.01)
*G06F 3/01* (2006.01)

(52) U.S. Cl.
CPC ............ *G06T 19/006* (2013.01); *G06F 3/011* (2013.01); *G06F 3/016* (2013.01); *G06F 3/017* (2013.01)

(58) Field of Classification Search
None
See application file for complete search history.

(56) References Cited

U.S. PATENT DOCUMENTS

| 5,900,849 A | 5/1999 | Gallery |
| 6,152,854 A | 11/2000 | Carmein |

(Continued)

FOREIGN PATENT DOCUMENTS

| EP | 0772790 A1 | 5/1997 |
| EP | 2693255 A1 | 2/2014 |

(Continued)

OTHER PUBLICATIONS

Pan et al. (Virtual reality and mixed reality for virtual learning environments, Computer & Graphics 30, 2006, 20-28).*
Sud et al. (Real-time Path Planning in Dynamic Virtual Environment Using Multiagent Navigation Graphs, vol. 14, No. 3, May/Jun. 2008).*
Schmalstieg et al. (Bridging Multiple User Interface Dimensions with Augmented Reality, IEEE, Oct. 6, 2000).*
Billinghurst et al. (Collaboration with tangible augmented reality interfaces, HCI international, 2001).*
Biggers, et al., "Inference-based Surface Reconstruction of Cluttered Environments", In Technical Report Tamu-CS-TR-2009-6-1, Aug. 2012, 12 pages.

(Continued)

*Primary Examiner* — Kyle Zhai
(74) *Attorney, Agent, or Firm* — Lyon & Harr, LLP; Mark A. Watson

(57) ABSTRACT

A "Shared Tactile Immersive Virtual Environment Generator" (STIVE Generator) constructs fully immersive shared virtual reality (VR) environments wherein multiple users share tactile interactions via virtual elements that are mapped and rendered to real objects that can be touched and manipulated by multiple users. Generation of real-time environmental models of shared real-world spaces enables mapping of virtual interactive elements to real objects combined with multi-viewpoint presentation of the immersive VR environment to multiple users. Real-time environmental models classify geometry, positions, and motions of real-world surfaces and objects. Further, a unified real-time tracking model comprising position, orientation, skeleton models and hand models is generated for each user. The STIVE Generator then renders frames of the shared immersive virtual reality corresponding to a real-time field of view of each particular user. Each of these frames is jointly constrained by both the real-time environmental model and the unified real-time tracking model.

17 Claims, 7 Drawing Sheets

Exemplary Highlighted Safe-to-Walk Indicators

(56) References Cited

U.S. PATENT DOCUMENTS

| | | |
|---|---|---|
| 6,191,796 B1 | 2/2001 | Tarr |
| 6,268,862 B1 | 7/2001 | Uchiyama et al. |
| 6,441,815 B1 | 8/2002 | McDowall et al. |
| 6,891,518 B2 | 5/2005 | Sauer et al. |
| 7,398,481 B2 | 7/2008 | Kraus et al. |
| 7,864,168 B2 | 1/2011 | French |
| 7,864,173 B2 | 1/2011 | Handley et al. |
| 7,889,195 B2 | 2/2011 | Shih et al. |
| 7,973,786 B2 | 7/2011 | Gyorfi et al. |
| 8,225,226 B2 | 7/2012 | Skourup et al. |
| 8,243,099 B2 | 8/2012 | Ryu et al. |
| 8,271,365 B2 | 9/2012 | Jung et al. |
| 8,350,843 B2 | 1/2013 | Rogowitz et al. |
| 8,384,665 B1 | 2/2013 | Powers, III et al. |
| 8,553,049 B2 | 10/2013 | Nogami et al. |
| 8,574,076 B2 | 11/2013 | Mahajan et al. |
| 8,576,276 B2 | 11/2013 | Bar-Zeev et al. |
| 8,585,476 B2 | 11/2013 | Mullen |
| 8,624,924 B2 | 1/2014 | Dobbins et al. |
| 8,730,156 B2 | 5/2014 | Weising et al. |
| 2002/0190989 A1* | 12/2002 | Kamata .................. G06T 15/40 345/440 |
| 2005/0131846 A1 | 6/2005 | Kurzweil |
| 2006/0024647 A1 | 2/2006 | Chesnais et al. |
| 2006/0105838 A1 | 5/2006 | Mullen |
| 2006/0209019 A1 | 9/2006 | Hu |
| 2006/0273984 A1 | 12/2006 | Wanda et al. |
| 2008/0180654 A1 | 7/2008 | Bathiche et al. |
| 2008/0215994 A1 | 9/2008 | Harrison et al. |
| 2008/0266323 A1 | 10/2008 | Biocca et al. |
| 2009/0225074 A1 | 9/2009 | Bates et al. |
| 2009/0262118 A1 | 10/2009 | Arikan et al. |
| 2010/0103075 A1 | 4/2010 | Kalaboukis et al. |
| 2010/0103196 A1 | 4/2010 | Kumar et al. |
| 2010/0246675 A1 | 9/2010 | Gharavi-Alkhansari et al. |
| 2010/0315412 A1 | 12/2010 | Sinha et al. |
| 2011/0078592 A1 | 3/2011 | Dawson et al. |
| 2011/0112328 A1 | 5/2011 | Drovetskaya et al. |
| 2011/0216089 A1 | 9/2011 | Leung |
| 2012/0017147 A1 | 1/2012 | Mark |
| 2012/0113223 A1 | 5/2012 | Hilliges et al. |
| 2012/0122570 A1 | 5/2012 | Baronoff |
| 2012/0139906 A1 | 6/2012 | Zhang et al. |
| 2012/0142415 A1 | 6/2012 | Lindsay |
| 2012/0147039 A1 | 6/2012 | Wang et al. |
| 2012/0249587 A1 | 10/2012 | Anderson et al. |
| 2012/0264510 A1 | 10/2012 | Wigdor et al. |
| 2013/0093788 A1* | 4/2013 | Liu ........................ G06F 3/011 345/633 |
| 2013/0120365 A1 | 5/2013 | Lee et al. |
| 2013/0141421 A1 | 6/2013 | Mount et al. |
| 2013/0196772 A1 | 8/2013 | Latta et al. |
| 2013/0222393 A1 | 8/2013 | Merrell et al. |
| 2013/0296043 A1 | 11/2013 | Weinshanker et al. |
| 2013/0335405 A1 | 12/2013 | Scavezze et al. |
| 2014/0022283 A1 | 1/2014 | Chan et al. |
| 2014/0104274 A1 | 4/2014 | Hilliges et al. |
| 2014/0128161 A1 | 5/2014 | Latta et al. |
| 2014/0139551 A1 | 5/2014 | McCulloch et al. |
| 2014/0152558 A1 | 6/2014 | Salter et al. |
| 2014/0160157 A1 | 6/2014 | Poulos et al. |
| 2014/0168264 A1 | 6/2014 | Harrison et al. |
| 2014/0198017 A1 | 7/2014 | Lamb et al. |
| 2014/0285518 A1 | 9/2014 | Tanaka et al. |
| 2014/0361977 A1 | 12/2014 | Stafford et al. |
| 2014/0364215 A1 | 12/2014 | Mikhailov et al. |
| 2014/0368537 A1 | 12/2014 | Salter et al. |
| 2015/0024368 A1* | 1/2015 | King, Jr. .................. G09B 5/02 434/365 |
| 2015/0235434 A1 | 8/2015 | Miller et al. |
| 2016/0054837 A1 | 2/2016 | Stafford |

FOREIGN PATENT DOCUMENTS

| | | |
|---|---|---|
| EP | 2724191 A2 | 4/2014 |
| WO | 1997019398 A1 | 5/1997 |
| WO | 2011112328 A2 | 9/2011 |
| WO | 2013155217 A1 | 10/2013 |
| WO | 2014033722 A1 | 3/2014 |
| WO | 2014053346 A1 | 4/2014 |
| WO | 2015006784 A2 | 1/2015 |

OTHER PUBLICATIONS

Bohil, et al., "Anatomy of a Virtual Environment", In Journal of Nature Reviews Neuroscience, Dec. 2011, 4 pages.

Dubey, et al., "Inertia Reduction in Haptic Devices Using Force Feedback Method", In International Journal of Advanced Research in Computer Science and Software Engineering, vol. 2, Issue 8, Aug. 2012, pp. 28-36.

Fisch, et al., "Haptic Devices for Virtual Reality, Telepresence and Human-Assistive Robotics", In Proceedings of Biologically-Inspired Intelligent Robots, May 13, 2003, 24 pages.

Fleury, et al., "A Generic Model for Embedding Users' Physical Workspaces into Multi-Scale Collaborative Virtual Environments", In 20th International Conference on Artificial Reality and Telexistence (ICAT), Dec. 1, 2010, 8 pages.

Gurocak, Haptic Interfaces, Published on: Apr. 16, 2013, Available at: http://research.vancouver.wsu.edu/dr-hakan-gurocak/haptic-interfaces.

Hammer, et al., "Robust hand Tracking in Realtime using a Single Head-Mounted RGB Camera", In Proceedings of 15th International Conference, HCI International, Part 4, Jul. 21, 2013, 4 pages.

Hill, Matt., Opinion: Oculus selling to Facebook is no shock, the future of VR is not games, Published on: Mar. 26, 2014, Available at: http://www.t3.com/news/opinion-oculus-selling-to-facebook-is-no-shock-the-future-of-vr-is-not-games-1.

Jarvis, Matthew., "Backed to the Future: The Crowdfunded Tech of 2014 and Beyond", Published on: Dec. 6, 2013, Available at: http://www.per-online.biz/news/read/backed-to-the-future-the-crowdfunded-tech-of-2014-and-beyond/032657.

Kale, Emory, "Disney Research Develops Method To Provide Tactile Feedback In Free Air", Published on: Jul. 19, 2013, Available at: http://www.tgdaily.com/general-science-brief/72566-disney-research-develops-method-to-provide-tactile-feedback-in-free-air.

Kanbara, et al., "A Stereoscopic Video see-through Augmented Reality System based on Real-Time vision-based Registration", In Proceedings of IEEE Virtual Reality, Mar. 18, 2000, 8 pages.

Knopf, et al., "Reconstructing complex scenes for virtual reality", In SPIE, Oct. 20, 2011, 3 pages.

Mackay, Wendy E., Augmented Reality: Linking Real and Virtual Worlds A New Paradigm for Interacting With Computers, In Proceedings of ACM Conference on Advanced Visual Interfaces, May 24, 1998, 10 pages.

Merrell, et al., "Interactive Furniture Layout Using Interior Design Guidelines" ACM Transactions on Graphics Proc., SIGGRAPH 2011, 9 pages.

Milgram, et al., "A Taxonomy of Mixed Reality Visual Displays", In Proceedings of IEICE Transactions on Information and Systems, vol. E77-D, No. 12, Dec. 1994, 14 pages.

Nystrom, et al., "Modern Web and Video Technologies Survey for New Interactions", In Compeit Survey, Nov. 2013, 22 pages.

Patkar, et al., "Marker Based Augmented Reality Using Android OS", In International Journal of Advanced Research in Computer Science and Software Engineering, vol. 3, Issue 5, May 2013, 6 pages.

Posada, et al., "Semantic Classification of Scenes and Places with Omnidirectional Vision", In European Conference on Mobile Records, Sep. 25, 2013, pp. 113-118.

Regenbrecht, et al., "Virtual Reality Aided Assembly with Directional Vibro-Tactile Feedback", In Proceedings of the 3rd international conference on Computer graphics and interactive techniques, Nov. 29, 2005, 9 pages.

(56) References Cited

OTHER PUBLICATIONS

Rhienmora, et al., "Augmented Reality Haptics System for Dental Surgical Skills Training", In Proceedings of 17th ACM Symposium on Virtual Reality Software and Technology, Nov. 22, 2010, 2 pages.

Shapira, et al., U.S. Appl. No. 14/633,661, "Creating Virtual Environments to Match Real Environments", filed Feb. 27, 2015.

Smelik, et al., "A Survey on Procedural Modeling for Virtual Worlds", In Computer Graphics Forum, Jan. 15, 2014, 20 pages.

Snowdon et al., Collaborative Collaborative Virtual Environments: Digital Spaces and Places for CSCW: An Introduction, Springer Verlag, 2000, pp. 1-34.

Subramanian, et al., "Feeling Virtual Objects in Mid-Air Using Ultrasound", In Proceedings of ACM Transactions on Graphics, Dec. 3, 2014, 3 pages.

Sung, Dan, "The World's Most Hotly Anticipated Wearables", Published on: Feb. 25, 2015, Available at: http://www.wareable.com/internet-of-things/the-worlds-most-hotly-anticipated-wearables.

Thimmesch, Debra, "Japanese Tech Firm, Miraisens, Unveils New "Touchable" 3D Technology Which May Influence 3D Printing", Published on: Sep. 4, 2014, Available at: http://3dprint.com/13596/touchable-3d-technology/.

Verdie, et al. "Detecting parametric objects in large scenes by Monte Carlo sampling." International Journal of Computer Vision, Springer Verlag (Germany), 2014, 106 (1), pp. 57-75.

Ye, et al., "VisHap: Augmented Reality Combining Haptics and Vision", In Proceedings of IEEE International Conference on Systems, Man and Cybernetics, vol. 4, Oct. 5, 2003, pp. 3425-3431.

Yu, et al., Make it Home: Automatic Optimization of Furniture Arrangement. ACM Trans. Graph. 30, 4, Article 86 (Jul. 2011), 11 pages.

Bailenson, Jeremy N., "Transformed Social Interaction in Collaborative Virtual Environments", In Proceedings of Digital Media: Transformations in Human Communication, Jan. 2006, pp. 1-20.

Dodds, Trevor, "Trevor Dodds—Max Plank Institute for Biological Cybernetics", Published on: Jul. 6, 2013 Available at: http://www.kyb.tuebingen.mpg.de/nc/employee/details/dodds.html.

"VHIL: Virtual Human Interaction Lab", Retrieved on: Mar. 9, 2015 Available at: http://vhil.stanford.edu/projects/archive/.

"Collaborative Virtual Environments", Published on: Dec. 22, 2013 Available at: http://www.vrs.org.uk/virtual-reality-environments/collaborative.html.

"The Virtual Reality Headset", Published on: May 3, 2009 Available at: http://www.vrs.org.uk/virtual-reality/headset.html.

Hrimech, et al., "How 3D Interaction Metaphors Affect User Experience in Collaborative Virtual Environment", In Journal of Advances in Human-Computer Interaction, vol. 2011, Jan. 1, 2011, 18 pages.

Sampson, Demetrios G., "Collaborative Virtual Environments: Digital Places and Spaces for Interaction", In Journal of Educational Technology & Society, vol. 5, Issue 4, Oct. 2002, 3 pages.

Fuchs, et al., "Virtually Face-To-Face: Telecommunication and Collaboration using Virtual Reality", In Proceedings of IEEE Virtual Reality, Mar. 16, 2013, 3 pages.

Sud, et al., Real-Time Path Planning in Dynamic Virtual Environment Using Multiagent Navigation Graphs, IEEE Trans. Vis. Comput. Graph., vol. 14, No. 3, May/Jun. 2008, pp. 526-538.

Hilgendorf, U.S. Notice of Allowance, U.S. Appl. No. 14/724,360, dated Jan. 4, 2017, pp. 1-10.

International Preliminary Report on Patentability Issued in PCT Application No. PCT/US2016/016039, dated May 9, 2017, 10 pages.

Wu, U.S. Notice of Allowance, U.S. Appl. No. 14/633,661, dated Jun. 28, 2017, pp. 1-47.

Hilgendorf, U.S. Notice of Allowance, U.S. Appl. No. 14/724,360, dated Jul. 24, 2017, pp. 1-17.

Billinghurst, M., et al, 'Tangible augmented reality, presetned at the ACM SIGGRAPH ASIA 2008 courses, Singapore, Dec. 2008, pp. 1-10.

Broll, W., et al, "The virtual round table: A collaborative augmented multi-user environment," Proc. of the 3rd Int'l Conf. on Collaborative Virtual Environments, CVE 2000, Sep. 10-12, 2000, pp. 39-45.

Basso, C., et al., Fitting 3D morphable models using implicit representations, J. of Virtual Reality and Broadcasting, vol. 4, No. 18, Apr. 2007, pp. 1-10.

International Search Report and Written Opinion, PCT/US2016/016039, dated Jun. 6, 2016, 14 pages.

"International Search Report and Written Opinion Issued in PCT Application No. PCT/US2016/030619", dated Jul. 25, 2016, 16 pages.

Salzmann, et al., "The Two-User Seating Buck: Enabling Face-to-Face Discussions of Novel Car Interface Concepts", In Proceedings of IEEE Virtual Reality Conference, Mar. 8, 2008, pp. 75-82.

Wu, Sing-Wai, U.S. Office Action, U.S. Appl. No. 14/633,661, dated Aug. 24, 2016, pp. 1-36.

Hilgendorf, U.S. Office Action, U.S. Appl. No. 14/724,360, dated Aug. 24, 2016, pp. 1-25.

Wu, U.S. Final Office Action, U.S. Appl. No. 14/633,661, dated Mar. 2, 2017, pp. 1-44.

Hilgendorf, U.S. Office Action, U.S. Appl. No. 14/724,360, dated Mar. 15, 2017, pp. 1-17.

"Second Written Opinion Issued in PCT Application No. PCT/US2016/030619", dated Apr. 25, 2017, 13 pages.

Wu, U.S. Notice of Allowance, U.S. Appl. No. 14/633,661, dated Oct. 26, 2017, pp. 1-5.

\* cited by examiner

SHARED TACTILE INTERACTION AND USER SAFETY IN SHARED SPACE MULTI-PERSON IMMERSIVE VIRTUAL REALITY

BACKGROUND

Many applications for augmented reality (AR) devices and scenarios construct augmented content, such as 2D overlays, text, virtual objects, etc. Augmented content may also be added to other types of applications, such as 2D overlays and text over an image. In other words, an AR device often shows a view of the world, with some overlay layer of information. In contrast to these types of AR scenarios, virtual reality (VR) devices, such as a wearable headset, generally present the user with a completely virtual environment.

A variety of mechanisms exist that provide haptic feedback in both AR and VR scenarios. For example, such mechanisms include haptic devices that are held by or attached to the user. Examples of these types of haptic devices include force-feedback video game controllers, wearable gloves that provide sensation or stimulation to the user's hand, movable arms that contact the user's finger or hand, directed air blasts, directed sound fields, etc. These types of haptic feedback devices are generally synched to AR, VR or other media content that is being presented to the user to enhance the user experience with various types of tactile sensations.

SUMMARY

The following Summary is provided to introduce a selection of concepts in a simplified form that are further described below in the Detailed Description. This Summary is not intended to identify key features or essential features of the claimed subject matter, and it is not intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Shared Tactile Immersive Virtual Environment Generator" (i.e., a "STIVE Generator"), as described herein, constructs fully immersive shared virtual reality (VR) environments with shared tactile interactions. These fully immersive shared VR environments enable multiple users to concurrently share tactile interactions via virtual elements that are mapped and rendered to real objects that can be touched and manipulated by multiple users. Since the VR environment is fully immersive, the real-world space around the multiple users is replaced with that VR environment. In other words, the real-world space, and thus real objects and people within that space, are not visible to users unless virtual representations of those objects or people are intentionally rendered into the shared immersive virtual environment. However, virtual elements mapped and rendered to positions of real objects and surfaces in the real world enable users to move around within the real-world space, without seeing that space, while physically touching and interacting with the virtual elements mapped and rendered to real objects and surfaces.

Generation of real-time environmental models of shared real-world spaces enables mapping of the virtual interactive elements to real objects combined with multi-viewpoint presentation of the immersive VR environment to multiple users. These real-time environmental models classify geometry, positions, and motions of real-world surfaces and objects. Further, the STIVE Generator also constructs unified real-time tracking models for each user. In various implementations, these unified real-time tracking models include various combinations of user position, user orientation, user skeleton models, user hand models, and user facial expression models. The STIVE Generator then renders frames of the shared immersive virtual environment corresponding to a real-time field of view of each particular user. In other words, each user sees a view of the shared immersive virtual environment that is tailored to the real-time field of view of each particular user. Each of these frames is jointly constrained by both the real-time environmental model and the unified real-time tracking model.

Advantageously, various features and capabilities of the STIVE Generator, such as the ability of multiple users to share real tactile feedback in immersive virtual environments, serve to improve user experience. Further, given that multiple users may be participating in immersive virtual environments in the same real-world space as other people and both static and dynamic objects, in various implementations, the immersive virtual environment is rendered in a way that enhances user safety with respect to inadvertent contacts between users, other persons, objects, surfaces, etc.

In view of the above summary, the STIVE Generator described herein provides various techniques for rendering and presenting fully immersive shared virtual reality (VR) environments in which multiple users in a shared real-world space share tactile interactions within the immersive shared VR. In addition to the benefits described above, other advantages of the STIVE Generator will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
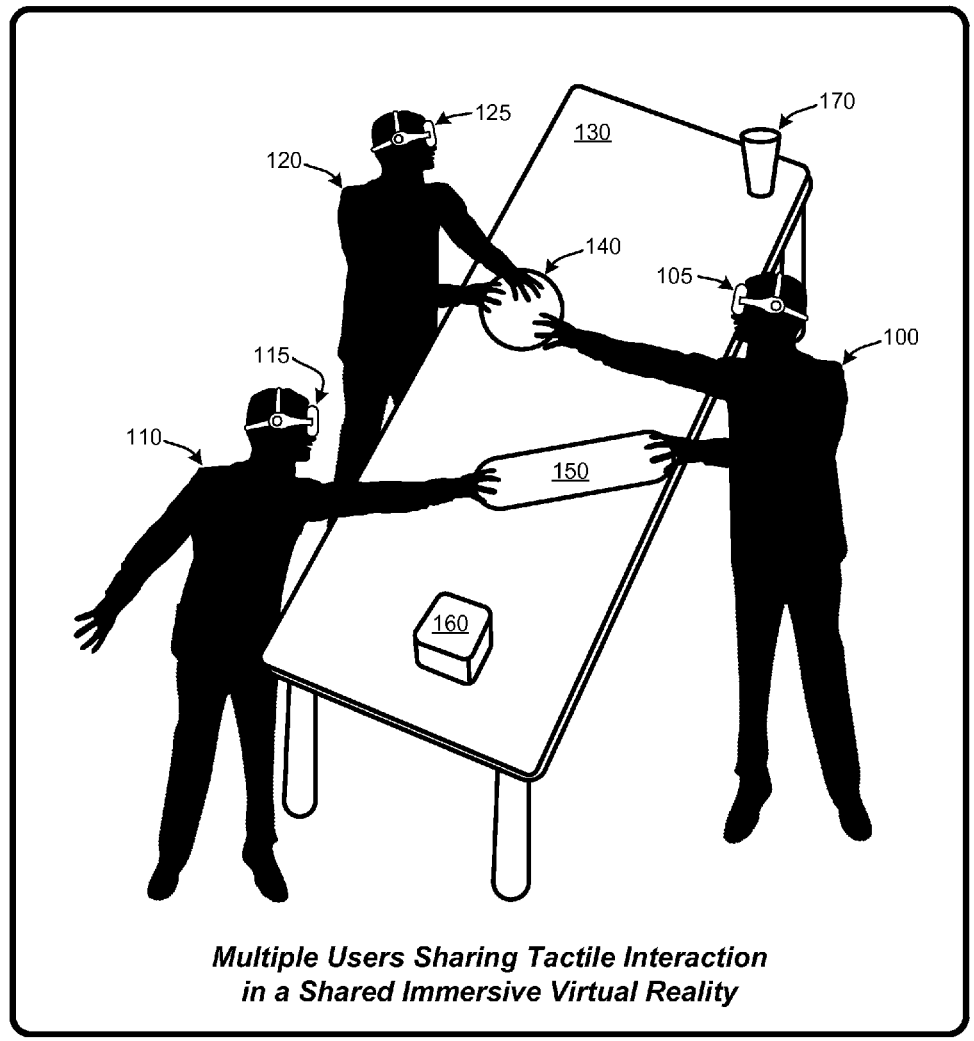
FIG. 1 illustrates multiple users sharing tactile interactions in a shared immersive virtual reality (VR) environment rendered for each user by a "Shared Tactile Immersive Virtual Environment Generator" (STIVE Generator), as described herein.

In the following description of various implementations of a "Shared Tactile Immersive Virtual Environment Generator" (STIVE Generator), reference is made to the accompanying drawings, which form a part hereof, and in which is shown by way of illustration specific implementations in which the STIVE Generator may be practiced. Other implementations may be utilized and structural changes may be made without departing from the scope thereof.

For the sake of clarity, specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the STIVE Generator. Further, the appearance of such phrases throughout the specification are not necessarily all referring to the same implementation, and separate or alternative implementations are not mutually exclusive of other implementations. The order described or illustrated herein for any process flows representing one or more implementations of the STIVE Generator does not inherently indicate any requirement for the processes to be implemented in the order described or illustrated, and any such order described or illustrated herein for any process flows does not imply any limitations of the STIVE Generator.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, a "Shared Tactile Immersive Virtual Environment Generator" (i.e., a "STIVE Generator"), as described herein, constructs fully immersive shared virtual reality (VR) environments with shared tactile interactions. These fully immersive shared VR environments enable multiple users to concurrently share tactile interactions via virtual elements that are mapped and rendered to real objects that can be touched and manipulated by multiple users. In various implementations, this shared immersive virtual environment is rendered and presented to users in a way that fully replaces any view of the real-world space around the users. In other words, the real-world space, and thus real objects and people within that space, are not visible to users unless virtual representations of those objects or people are intentionally rendered into the shared immersive virtual environment.

More specifically, in various implementations, the STIVE Generator begins operation by generating a real-time environmental model of a real-world environment in which a shared immersive virtual environment is being presented to two or more users. In general, these real-time environmental models classify geometry, positions, and motions of surfaces and objects in the real-world environment in which multiple users are participating in the shared immersive virtual environment. In addition, the STIVE Generator generates a unified real-time tracking model for each of the two or more users.

Then, for each particular user, the STIVE Generator renders frames of the shared immersive virtual environment corresponding to a real-time field of view of each particular user. Since each user will be in a different position, with a different field of view, when rendering frames of the shared immersive virtual environment for each particular user, the STIVE Generator jointly constrains each frame relative to both the real-time environmental model and each of the unified real-time tracking models. Finally, in various implementations, the STIVE Generator maps and renders one or more virtual elements of the shared immersive virtual environment to real objects in the real-world environment that can be touched and manipulated by two or more of the users to provide shared tactile interaction.

As noted above, the shared immersive virtual environment is rendered and presented to users in a way that fully replaces any view of the real-world space around the users. Consequently, users see the virtual elements of the shared immersive virtual environment rather than the real objects to which those virtual elements are mapped. As such, the virtual elements may appear similar to the corresponding real-world objects, or may appear very different from those objects. For example, a real-world sphere or cube (or any other shape) may be mapped to a virtual sun surrounded by virtual planets. Users can then pick up and manipulate the real-world sphere or cube (while only seeing the virtual sun surrounded by virtual planets) to rotate, scale, translate, physically hand to another user, or otherwise interact with the virtual sun and virtual planets.

By way of example, FIG. 1 illustrates three users (100, 110, and 120) each immersed in a shared immersive virtual environment via head-worn VR display devices (105, 115, and 125). Each of these users (100, 110, 120) are positioned around a real-world table 130, which may appear to those users as any desired virtual element (e.g., a virtual log, a virtual window to outer space, etc.). Several real-world objects (140, 150, 160, and 170) are placed on the real-world table 130. However, as noted above, each of the real-world objects (140, 150, 160, and 170) may be rendered into the shared immersive virtual environment as any desired virtual element.

Further, FIG. 1 shows users 100 and 110 concurrently interacting with real-world element 150, which appears to them as some virtual element. Similarly, FIG. 1 shows users 100 and 120 concurrently interacting with real-world element 140, which again appears to them as some virtual element. Each of these virtual elements may be interactive. Further, any movement, rotation, etc., of any real-world object (e.g., 150, 140) will result in corresponding real-time movements, rotations, etc., of the virtual elements mapped and rendered to those real-world objects.

Figure 2:
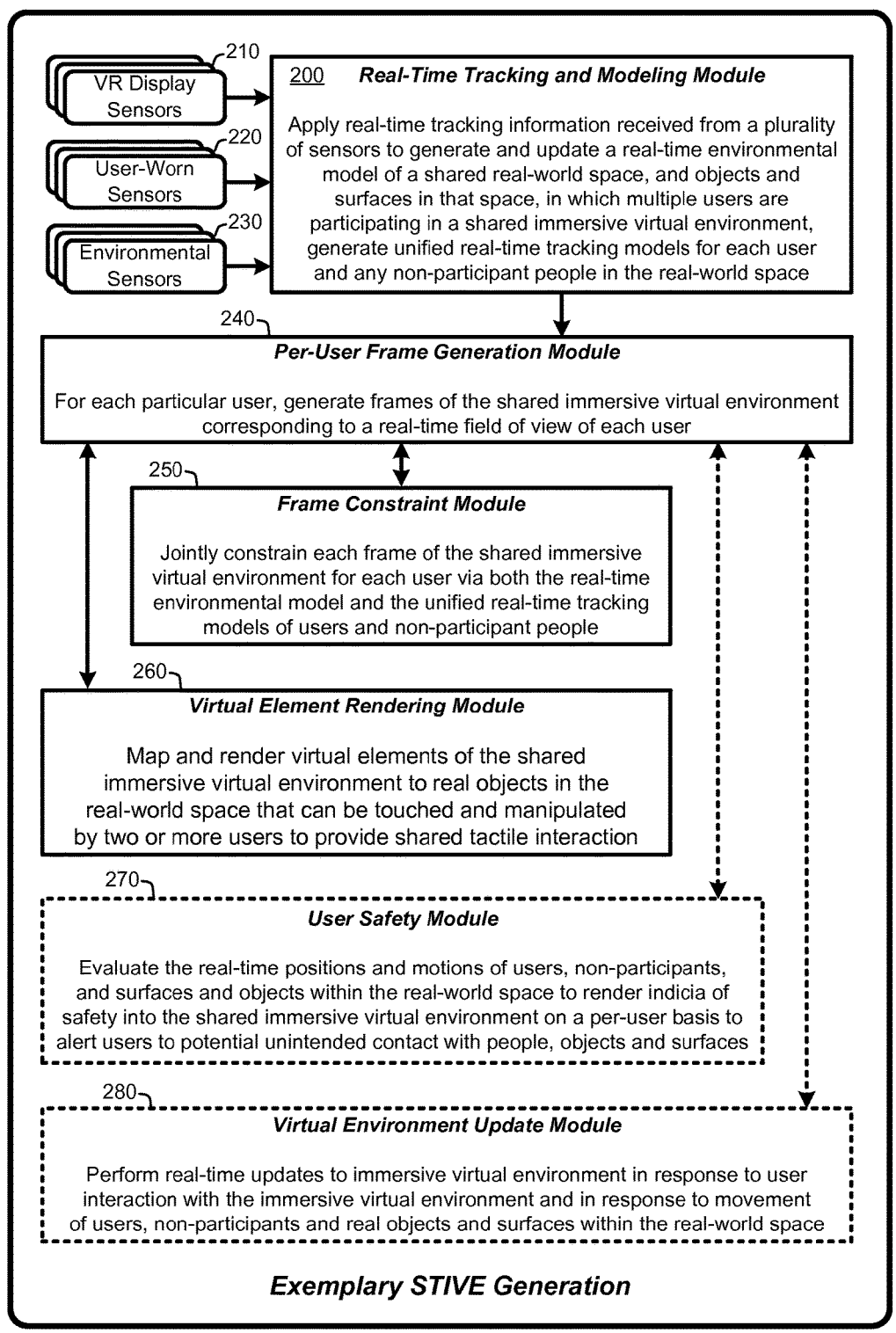
FIG. 2 illustrates an architectural flow diagram that illustrates program modules for effecting various implementations of the STIVE Generator for rendering and presenting fully immersive shared VR environments in which multiple users in a shared real-world space share tactile interactions within the immersive shared VR, as described herein.

1.1 System Overview:

As noted above, the STIVE Generator provides various techniques for rendering and presenting fully immersive shared virtual reality (VR) environments in which multiple users in a shared real-world space share tactile interactions within the immersive shared VR. The processes summarized above are illustrated by the general system diagram of FIG. 2. In particular, the system diagram of FIG. 2 illustrates the interrelationships between program modules for implementing various implementations of the STIVE Generator, as described herein. Furthermore, while the system diagram of FIG. 2 illustrates a high-level view of various implementations of the STIVE Generator, FIG. 2 is not intended to provide an exhaustive or complete illustration of every possible implementation of the STIVE Generator as described throughout this document.

In addition, any boxes and interconnections between boxes that may be represented by broken or dashed lines in FIG. 2 represent alternate implementations of the STIVE Generator described herein, and that any or all of these alternate implementations, as described below, may be used in combination with other alternate implementations that are described throughout this document.

In general, as illustrated by FIG. 2, in various implementations, the processes enabled by the STIVE Generator begin operation by using a real-time tracking and modeling module 200 that receives real-time tracking information from a plurality of sensors (e.g., VR display device sensors 210, user-worn sensors 220, and environmental sensors 230). The real-time tracking and modeling module 200 applies this tracking information to generate and update a real-time environmental model of a shared real-world space, and objects and surfaces in that space, in which multiple users are participating in a shared immersive virtual environment. In addition, the real-time tracking and modeling module 200 applies the tracking information to generate unified real-time tracking models for each user and any non-participant people in the real-world space.

The real-time tracking and modeling module 200 then provides the real-time environmental model and the unified real-time tracking models to a per-user frame generation module 240. For each particular user, the per-user frame generation module 240 then generates frames of the shared immersive virtual environment corresponding to a real-time field of view of each user. Generation of these frames of the shared immersive virtual environment are constrained by several factors.

For example, a frame constraint module 250 jointly constrains each frame of the shared immersive virtual environment for each user via both the real-time environmental model and the unified real-time tracking models of users and non-participant people. In addition, a virtual element rendering module 260 map and renders virtual elements of the shared immersive virtual environment to real objects in the real-world space that can be touched and manipulated by two or more users to provide shared tactile interaction.

Further, in various implementations, a user safety module 270 evaluates the real-time positions and motions of users, non-participants, and surfaces and objects within the real-world space to render indicia of safety into the shared immersive virtual environment on a per-user basis to alert users to potential unintended contact with people, objects and surfaces. Examples of such indicia of safety include, but is not limited to highlighted safe-to-walk paths or areas (e.g., real-world spaces that are clear of real-world obstacles) that are rendered onto the floor of the real-world space, virtual avatars or the like rendered and mapped to real-time positions and motions of other users and non-participants in the real-world space, etc. Advantageously, such indicia of safety tends to increase user safety by helping users to avoid inadvertent contact with real objects, surfaces, people, etc., that are not otherwise visible to the user while the user is participating in the shared immersive virtual environment.

In addition, in various implementations, the STIVE Generator applies a virtual environment update module 280 that operates in combination with the per-user frame generation module 240 to perform real-time updates to the immersive virtual environment in response to user interaction with the shared immersive virtual environment and in response to movement of users, non-participants and real objects and surfaces within the real-world space.

2.0 Operational Details of the STIVE Generator:

The above-described program modules are employed for instantiating various implementations of the STIVE Generator. As summarized above, the STIVE Generator provides various techniques for rendering and presenting fully immersive shared virtual reality (VR) environments in which multiple users in a shared real-world space share tactile interactions within the immersive shared VR. The following sections provide a detailed discussion of the operation of various implementations of the STIVE Generator, and of exemplary methods for implementing the program modules described in Section 1 with respect to FIG. 1 and FIG. 2. In particular, the following sections provides examples and operational details of various implementations of the STIVE Generator, including:

Operational overview of the STIVE Generator;
General definitions;
Exemplary VR display and sensor setup;
Tracking and scene understanding;
Mapping coordinate systems;
Collective data gathering and sensor fusion;
User safety;
Shared tactile interaction; and
Flexible mapping and scaling of the shared virtual environment.

2.1 Operational Overview:

As noted above, in various implementations, the STIVE Generator constructs fully immersive shared virtual environments wherein multiple users share tactile interactions via virtual elements that are mapped and rendered to real objects that can be touched and manipulated by multiple users. In view of the following discussion, it can be seen that the ability to share real tactile feedback in immersive virtual environments serves to improve user experience.

Further, given that multiple users (and potentially other non-participating people) are participating in the shared immersive virtual environment in the same real-world space, and that there may be real-world furniture, surfaces, static and dynamic objects, etc., in that real-world space, user safety, and safety of non-participants may be a concern.

Consequently, in various implementations, the STIVE Generator address such concerns by rendering indicia of safety into the shared immersive virtual environment. These indicia of safety enhance user safety by enabling users to avoid contact with users, non-participants, obstacles, objects, surfaces, etc. As such, in various implementations, one of the considerations for generation of the shared immersive virtual environment is to generate that virtual environment in a way that doesn't interfere with the immersive nature of the experience while making users aware of relevant elements of their surroundings without actually showing the real-world environment to the user.

With the predicted prevalence of VR devices in the near future, the sharing of virtual environments between multiple users in a shared real-world space with shared tactile interaction enables a wide range of collaboration and interaction between people in virtual worlds. In general, collaboration and interaction between people in a virtual world can be categorized as occurring in either a shared physical space or in two or more remote physical spaces. Moreover, in a shared physical space, there are three groups of people that may be considered with respect to a first user that is wearing a VR display device and participating is a shared virtual environment.

For example, a first group consists of one or more additional users wearing a VR device and collaborating with the first user via a shared immersive virtual environment. In this scenario, two or more users share an immersive VR, which may include any desired real or synthesized audio and audio effects (e.g., surround sound effects, music, nature sounds, etc.), depending on the shared immersive VR being presented. Avatars or digital representations of each user are rendered into the shared immersive VR in the actual real-world positions and orientations of each user so that users can see and interact with each other. Further, the shared immersive VR is presented to each user from the perspective of each user. In other words, as in the real world, each user sees a different view of the same immersive VR than other users since they are not viewing the immersive VR from the same viewpoint.

Another group consists of one or more additional users wearing a VR display device but participating in a different VR from that of the first user. Consequently, users may or may not be aware of the existence of any other users that are not in the same shared immersive VR. However, in various implementations, safety mechanisms are applied by rendering indicia of safety into the shared immersive virtual environment to ensure that there is no unintended contact. In other words, some users may not be experiencing the same reality as other users, whether that reality is real or virtual, and various indicia of safety may be rendered into these immersive virtual environments to ensure user safety.

Finally, a third group consists of one or more non-participant persons without a VR device that occupy the same real-world space as the first user (or multiple users). However, non-participants may still be modeled and rendered into the shared virtual environment to interact with users immersed in the shared virtual environment even though the non-participants may not be aware of the contents of that virtual environment. Various combinations of each of the three aforementioned groups are enabled by various implementations of the STIVE Generator.

Examples of features and capabilities enabled by various implementations of the STIVE Generator include, but are not limited to, the following:

Tracking and modeling users in the 3D environment of the shared real-world space;

User and non-participant hand tracking and gesture recognition;

Surface reconstruction of the shared real-world space;

Detection and tracking of secondary objects (such as people and moving objects) in the shared real-world space;

Enabling a wide range of shared virtual environment collaboration scenarios;

Tracking people in the shared real-world space, combined with semantic information to perform facial recognition with optional virtual tags (e.g., text of names or pertinent information hanging in the air next to persons for users to view (similar to tagging in photos);

Tracking people in the shared real-world space, combined with semantic information to perform person activity classification (e.g., sitting, standing, running) to allow custom safety measures (e.g., rendering any combination of visible and audio inputs into the shared immersive virtual environment);

Tracking people in the shared real-world space, combined with semantic information to perform VR engagement such as detecting whether a person is in a VR experience and wishes to engage in collaboration with other users or real or virtual objects using a discovery protocol;

Rendering visible and/or audible indicia of safety into the shared immersive virtual environment thereby improving user experience and user safety by preventing (or at least alerting) mobile users within the shared immersive virtual environment from inadvertently contacting other real people, objects, or surfaces in the shared real-world space;

Rendering avatars or virtual representations of users (and non-participants) corresponding to specific experiences or themes (e.g., classroom, pirate ship, space station, retail shopping experience, battlefield, etc.) associated with particular shared immersive virtual environments may be used as the basis for into the shared immersive virtual environment. For example user's may be rendered as ghosts in a haunted mansion, statues in a garden, forest animals in an outdoor experience, etc.;

Collaboration between multiple users is enables by using a discovery protocol to link two or more users in the same shared real-world space (including different rooms in a larger multiple room structure). In such cases, a global coordinate system covering both the real-world space and the shared immersive virtual environment enables the STIVE Generator to link the collaboratory experience of participants by automatically adapting the shared immersive virtual environment to the participants. For example in various implementations, the STIVE Generator procedurally generates a shared immersive virtual environment that takes into account multiple user positions, motions, and interactions when adapting the virtual experience to the shared real-world space.

2.2 General Definitions and Exemplary Configurations:

In various implementations, the setup the STIVE Generator for presenting shared immersive virtual environments involves a shared real-world space. Such spaces may be indoors, outdoors, or some combination of indoor and outdoor spaces. With respect to indoor spaces, those spaces may involve single rooms, multiple rooms, or even multiple separate structures (e.g., entire houses, buildings, stairs, elevators, etc.). In various implementations, if non-participant persons are present in the shared real-world space, the STIVE Generator dynamically modifies the shared immersive VR so that users are aware of the positions and movements of the non-participant in some way so that there is no inadvertent contact between users and non-participants.

In various implementations, the STIVE Generator presents the shared immersive virtual environment to users via a head-worn VR display device or eye-worn contacts with integral displays. Further, either such device may also operate in combination with optional audio playback devices (e.g., headphones). However, one or more external audio sources may also be positioned throughout the real-world space to provide audio sound effects for the shared immersive virtual environment. Because multiple users are intended to participate in the shared immersive virtual environment within a shared real-world space, users can simply talk to each other without the need for additional audio playback devices.

The general operational scenario can be described as two or more users, each of them wearing a head mounted display (HMD) or other VR display device such as eye-worn contacts with integral displays. Each HMD has integral sensors that can track the user, other users, objects and people in the shared real-world space around the user. Further, in various implementations, the STIVE Generator applies sensor data from user worn sensors and a variety of optional external sensors deployed throughout the shared real-world space around the user. In combination with various computer-based tracking and modeling processes, the sensor array enables a variety of sensor-based features and capabilities (e.g., user tracking and skeleton modeling, hand modeling and gesture-based controls, etc.).

For example, in various implementations, the user-worn VR display device includes multiple sensors or sensor arrays. The STIVE Generator may also operate using sensor data received from any desired combination of external or user-worn sensor devices. Examples of sensors that may be integral to the VR display device, worn by the user, and/or positioned throughout the real-world space include, but are not limited to, GPS, proximity sensors (e.g., ultrasonic, capacitive, photoelectric, inductive, magnetic, RFID, etc.), motion sensors (e.g., visible light, infrared light, ultrasound, microwave, radar, accelerometers, inertial sensors, etc.), image sensors, touch sensors, microphones, etc. Regardless of the source, this sensor data may be provided to a central computing device, e.g., local, network-based, cloud-based, etc., that manages the shared immersive VR, maps and renders virtual elements to real-world objects and surfaces, and enables the shared interactions between users.

More specifically, a room R (or any other real-world space) hosts a set of people $P=\{p_1, \ldots p_n\}$. Some people $A \subset P$ are equipped with an HMD and are participating in a shared immersive virtual environment V. The remaining people, P/A, are either not wearing an HMD ($B \subset P$) or wearing an HMD but not part of V ($C \subset P$). As such, the users of the STIVE Generator belong to subset A of the people in R, although the people (or virtual avatars or other representations) in subsets B and C may be rendered into the shared immersive virtual environment for various safety and interaction purposes.

In various implementations, the shared immersive virtual environment V is managed and rendered via a local, network, or cloud-based computing environment and has several types of nodes. These nodes of the shared immersive virtual environment V include, but are not limited to the following:

Node $a_i$—These nodes represent the individual users ($a_i$) that are participating in the shared immersive virtual environment via HMD's or other VR display devices. These nodes are tracked and modeled. These nodes also render the shared virtual world, and transfer feedback from the user interactions with the virtual world back into the computing environment. For example, in an exemplary scenario each user is tracked by position and orientation (e.g., 6DOF based tracking and modeling). Further, if sufficient tracking information is available, complete skeleton and hand models may also be constructed for each user. These skeleton and hand models can be computed partially by head mounted sensors (if the user's hand or body parts are visible to the head mounted sensors). Alternately, or in combination, these skeleton and hand models may be computed based on input from by external sensors. These external sensors can be positioned within the real-world environment around the user, or may be coupled to other users. Examples of external sensors include, but are not limited to, depth sensing cameras such as the Kinect® with vision-based tools for skeleton tracking, a motion-capture system using trackers worn by or attached to the user, etc.

Node $s_i$—These nodes represent individual sensors and sensor arrays accessible to the STIVE Generator. As noted above, such sensors may include any combination of sensors coupled to the VR display device, user worn sensors, and external sensors deployed throughout the real-world space. Such sensors are used to track and model people, surfaces, and objects in the real-world space and to construct virtual elements that are rendered and mapped to corresponding people, surfaces and objects the real-world space. For example, an RGB-D or other depth camera in a fixed location may be applied to reconstruct at least partial room structure. Such depth cameras may also be applied to perform skeleton tracking of one or more users. In addition, a fixed motion-capture system can track a large number of objects and people wearing motion-capture markers or the like to assist in user skeleton tracking.

Node R—This node represents a management node, e.g., a "sensor manager," which receives tracking information from various nodes in the network, maintains the status of tracked nodes, and outputs high-level data back to the various nodes. For example, non-participants are marked such that the various nodes can render them for safety or communication reasons. In various limitations, this node generates a scene object model (SOM) as described in further detail below. One challenging aspect of this process involves performing fusion of the different sensor input streams. For example, a standard surface reconstruction pipeline typically integrates frames from a single camera into a shared volume. However, the STIVE generator considers multiple points of view (POV) for this purpose in combination with scene understanding, e.g., object detection and classification, face detection, tracking etc.

2.4 Tracking and Scene Understanding:

The STIVE Generator applies a plurality of sensors to capture and model a semantic understanding of the geometry of the real-world space (e.g., surfaces and static objects in the scene), and to track and model dynamic objects and people within that real-world space.

Although each HMD or other VR display device worn by users may be equipped with sensors and sensor arrays capable of reconstructing the environment and detecting and tracking objects within the environment, such sensors typically have relatively limited fields of view or applicable ranges. Further, individual sensors and sensor arrays either worn or carried by the user or distributed throughout the environment typically also have relatively limited fields of view or applicable ranges. In addition, depending on sensor position, data returned by any of these sensors may be degraded by occlusions (e.g., sensor view of real-world object partially blocked by some surface, another object, or a person). Additionally, such sensors may not be able to fully observe the user (e.g., sensors in a head-worn VR display device may not be able to fully observe the user's hands or body, especially when the user tilts her head upwards to look up).

Therefore, in various implementations, the sensor manager performs a sensor fusion process that integrates the various sensor inputs, applies scene understanding techniques to obtain a semantic understanding of surfaces and objects (e.g., furniture, control devices, electronics, inert objects, etc.). In some scenarios, the sensors being managed by the sensor manager applies mutually exclusive sets or groups of sensors, e.g., one group sees part of the room and another group sees a different part. In either case, the sensor manager dynamically manages multiple coordinate systems, corresponding to each group of sensors, until the time that they are merged via the sensor fusion process.

Figure 3:
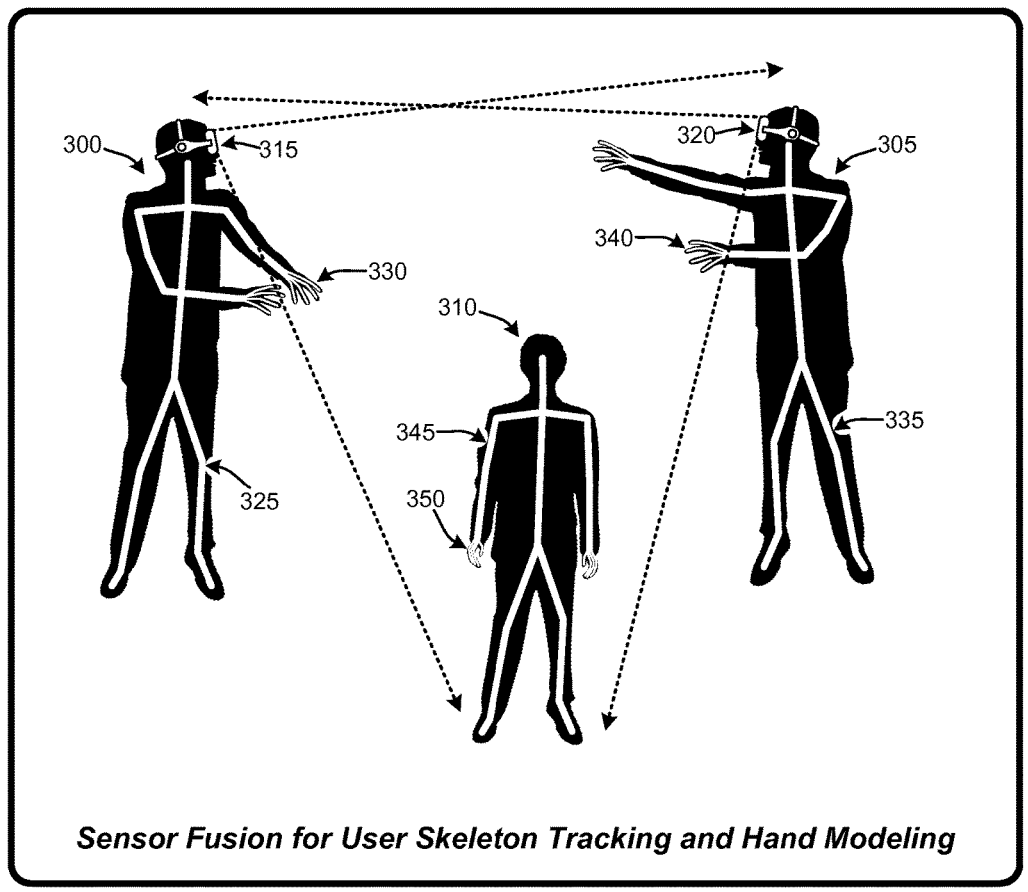
FIG. 3 illustrates an exemplary implementation of sensor fusion for user skeleton tracking and hand modeling for effecting various implementations of the STIVE Generator, as described herein.

In a very simple example of sensor fusion, sensors coupled to the VR display device of all users are used to track and model each user and any other users, non-participants, surfaces, and objects in the shared real-world space. FIG. 3 illustrates this example. In particular, FIG. 3 illustrates two users 300 and 305 and one non-participant person 310 in a shared real-world space. Sensors in head-mounted VR display devices (315 and 320) of users 300 and 305 are applied to observe other users and non-participants (with field of view of those sensors represented by broken lines). Such sensors may also be applied to model user and non-participant skeletons (e.g., skeleton models 325, 335 and 345), and user and non-participant hands (e.g., hand models 330, 340 and 250).

In addition, the sensor manager applies sensor data obtained from the real-world space to construct and maintain a scene object model (SOM) that dynamically evolves in real-time as users and objects move within the real-world space while interacting with the shared immersive virtual environment. In general, the SOM contains various levels covering the geometric structure of the scene and the objects within it, semantic information deduced about the objects and people present, and accurate tracking information that can cover people (general position), hand and skeleton tracking, and objects used in the simulation.

Figure 4:
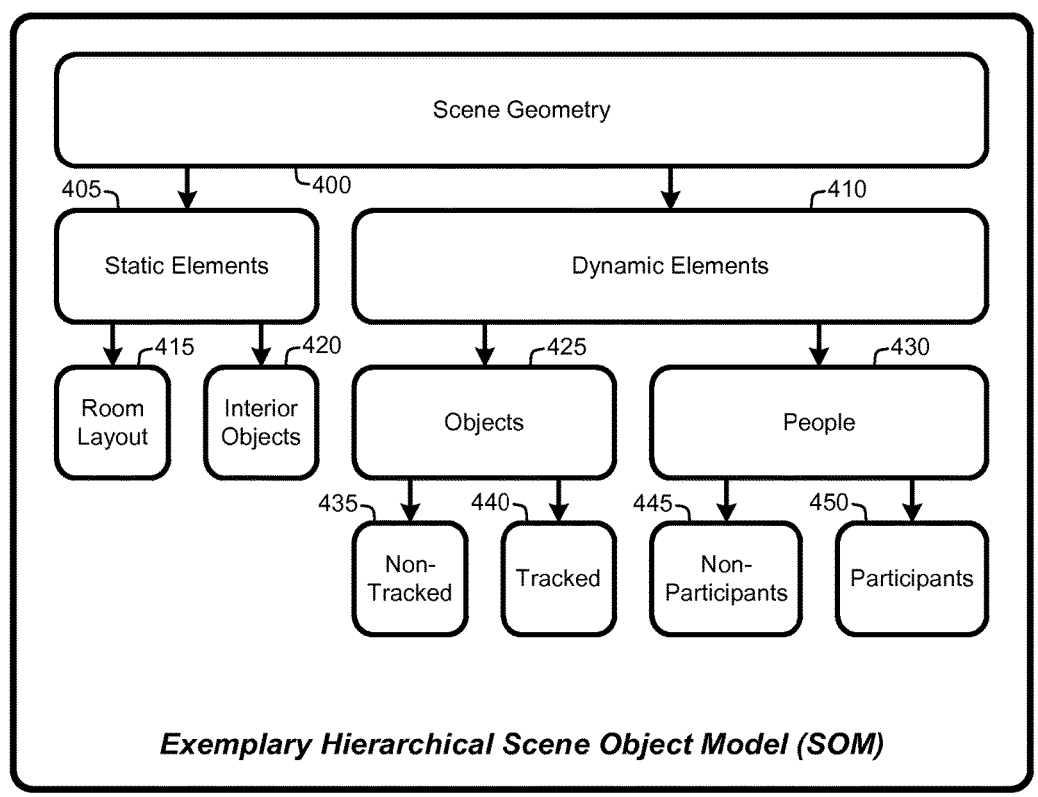
FIG. 4 illustrates an exemplary implementation of a hierarchical Scene Object Model (SOM), for effecting various implementations of the STIVE Generator, as described herein.

For example, FIG. 4 illustrates an exemplary hierarchical SOM. This hierarchical SOM represents scene geometry 400 that includes all relevant persons, objects and surfaces in the shared real-world space. In particular, the scene geometry 400 includes both static elements 405 and dynamic elements 410. The static elements 405 may be further modeled and categorized to provide a semantic understanding of both the room layout 415 and interior objects 420 in the room (or other real-world space). The dynamic elements 410 may be may be further modeled and categorized to provide a semantic understanding of moving or movable objects 425 and people 430. Some of these objects 425 are designated as non-tracked 435, while other objects 425 are designated as tracked 440. Similarly, people 430 are designated as non-participants 445 and participants 450 (i.e., users). The STIVE Generator performs an application-dependent determination about whether to designate particular objects as tracked or non-tracked objects. In general, objects are segmented and classified, and then initially marked as non-tracked. Objects than subsequently move may be marked as tracked. Further, the user or the application can select or specify objects or object classifications to be designated as tracked.

Given the tracking, modeling and semantic information of the real-world embodied by the SOM, the STIVE Generator can insert virtual objects in the place of real objects, hide particular objects or people (e.g., render other objects or characters in their place, or simple don't render anything in their place since the shared virtual environment fully replaces users views of the real-world environment), etc. However, the STIVE Generator may not actually model the entire shared real-world space around the user since it might be disruptive to the overall experience intended to be provided by the shared immersive virtual environment. For example, users sitting at a real conference table may see some virtual surface in the place of the conference table (e.g., log, box, etc.) while other portions of the shared real-world space around the user appears (via the shared immersive VR) as a lush impenetrable jungle, a room in an alien spacecraft with transparent floors looking out onto a planetary atmosphere from space, an underwater scene filed with swimming aquatic life and plants, etc.

Further, in some cases, with respect to user safety, the STIVE Generator applies the SOM to render various indicia of safety to mark "dangerous areas" (e.g., areas of potential unintended contact between the user and other users or real-world objects and surfaces). More specifically, in various implementations, the SOM is used to ensure user safety by rendering objects, people, warning indicators, etc., into positions within the shared immersive VR that users are likely to physically enter or interact with. For example, a non-participant person in the shared real-world space around the user can be rendered as a virtual glowing cactus, a virtual ghostly figure, a virtual zombie, (or any other virtual object, entity, or character) so that users of the shared immersive VR are alerted to avoid the physical space corresponding to that virtual object, entity, or character.

In various implementations, the STIVE Generator dynamically scans and models some or all of the shared real-world space around the user. The resulting sensor data is used to construct the SOM and the corresponding semantic understanding of the scene that enables the STIVE Generator to render virtual elements (matching some theme specified by the developer) into the corresponding real-world location of real-world objects, surfaces, users and non-participants.

For example, in various implementations, real-time tracking and motion data of users and objects in the shared real-world space is used to capture and model users, objects and surfaces based on environmental tracking and mapping information received from a plurality of sensors. As noted above, the sensors used for this purpose include any combination of head mounted sensors (e.g., coupled to the VR display device), body worn sensors, sensors dispersed throughout the shared real-world space, etc. The resulting tracking and environmental information is then applied to capture and map the shared real-world space, track and model each user and other real people (e.g., non-participants), and real objects and surfaces in the shared real-world space. Some or all of this tracking and modeling information is then consolidated and synched in real-time to the rendering of the shared immersive virtual environment being presented to the users.

More specifically, in various implementations, a tracking system component of the STIVE Generator maintains a global 3D coordinate system relative to the shared real-world space. This tracking system component maintains position $p_{u_i}$ for each user $u_i$ in combination with an orientation $o_{u_i}$ for each user relative to the global coordinate system. Further, in various implementations, the tracking system component also tracks a 3D skeleton model $s_{u_i}$ of each user and a 3D hand model $h_{u_i}$ of each of the user's hands. Synchronizing this tracking and modeling information to the shared immersive virtual environment enables the STIVE Generator to map and render virtual elements to real-world objects and surfaces that may be touched by users to provide shared tactile feedback. The aforementioned capability to dynamically manage multiple coordinate systems corresponding to different groups of sensors assists this process.

Advantageously, close tracking and modeling of user's bodies and hands enables real-time re-creation and rendering of user's bodies (or some virtual avatar or digital analog) in the same space as the user in way that increases user sense of self when participating in the shared immersive virtual environment. Consequently, depending on where users look in the immersive virtual environment, they may see corresponding virtual images of their own body and the virtual bodies of other users, which in each case mirrors real motions and movements the real bodies of the users within the shared real-world space. Such tracking and rendering of virtual avatars corresponding to the real-world motions of users tends to increase each user's sense of realism with respect to other users in the immersive virtual environment.

2.4.1 Exemplary Scene Understanding Processes:

In various implementations, the STIVE Generator performs scene understanding processes based on environmental information acquired from sensors applied to scan the real-world environment. In general, this scene understanding process classifies geometry of surfaces and objects within the real-world environment. For example, this scene understanding process determines locations of floors, walls, doors, ceilings, objects in the space, etc. In various implementations, the STIVE Generator optionally processes visible information using various image and object recognition techniques to complete missing information, such as, for example, partially visible objects behind a table.

More specifically, the scene understanding process operates to perform automated real-world environment layout inference and object detection to derive environmental information for arbitrary real-world environments from real-world environmental data received from various sensors. In various implementations, the scene understanding process applies various imaging and scene reconstruction techniques to construct a coarse 3D model of a real-world environment (e.g., single room, multiple rooms such as a home, complete office building floor or multiple floors, outdoor spaces, etc.) and detection of objects within that environment. This 3D model represents a course blueprint of the real-world environment that provides the geometric structure of the real-world environment at the level of floors, walls, ceilings, openings such as doors and windows, division into rooms, etc.

The object detection portion of the scene understanding process generally acts to apply various object recognition techniques and processes to detect positions and instances of real objects in the real-world environment from one or more large sets of object definitions, and to determine semantic understandings of those objects relative to the real-world environment. Object detection can be based on full or partial views of objects. For example, from the point of view of the user, or of imaging or scanning devices used to process the real-world environment, only the back of a chair (e.g., an approximately rectangular shape) may be visible adjacent to another real object already identified as a table. Contextual evaluation of this approximately rectangular shape may be sufficient to identify the object as a chair.

2.5 Exemplary Mapping Coordinate Systems:

The STIVE Generator applies various methods to establish a correspondence between physical position, physical movements, and virtual position of users, non-participants, and real objects in the shared real-world space. However, having multiple participants interact with each other and with virtual elements of the same shared immersive virtual environment in the same real-world shared space limits the coordinate mapping (relating to mapping and transformations of real-to-virtual movements and interactions of people and objects). In various implementations, the STIVE Generator fixes coordinate mapping transformation up to a scaling factor based on the assumption that all users of the shared immersive virtual environment are fixed in VR space at the beginning of the simulation relative to their positions in the corresponding shared real-world space.

In various implementations, this tracking mapping and transformations of real-to-virtual movements and interactions of people and objects is based on the use of a global coordinate system that is jointly synched to both the shared real-world space and to the shared immersive virtual environment being concurrently presented to multiple users.

For example, in the case of a stationary user, the user sits or stands in place (but may be moving arms or hands, and may be making control gestures with his hands). The user will be wearing a VR display device, which typically includes a plurality of motion sensors and capabilities (e.g., a motion-based controller). Consequently, the user's virtual position within the shared immersive virtual environment may be determined by applying tracking and motion-based controller data to determine the user's 6DOF position and orientation, combined with the controller's transformation. For example, the user can look around and perform minor movements, while most of the translation of the shared immersive virtual environment is synched to transformations determined via the motion-based controller.

In the case of a mobile user, when the simulation is started, the position and orientation of the user is set in the virtual world, and any motion he takes in the shared real-world space is mapped to corresponding motions in the shared immersive virtual environment. Rendering of the shared immersive virtual environment for one or more users then changes in real-time relative to the motions of each user.

In the case of simulated mobile users, the shared immersive virtual environment is fluid relative to the user rather than the other way around. For example, in such cases, the position and orientation of the user are set in the shared immersive virtual environment when the simulation starts, however simulated means of locomotion may be used to translate the user, without him physically moving (elevator, escalator, transporter). For example, the user may physically move into a position within the shared real-world space that appears to the user as an escalator within the shared immersive virtual environment. The user can then stop on that virtual representation of the escalator while the shared immersive virtual environment then dynamically transforms around the user in a way that appears as if the user is actually riding an escalator to a different floor of a building. In this way, the user is believably moved to a new virtual space within the shared immersive virtual environment without having to leave his current shared real-world space. These types of features enable the STIVE Generator to present large multi-room virtual environments to the user while enabling the user to move about within a single shared real-world environment. However, the STIVE Generator is fully capable of operating within any combination of large multi-room structures and outdoor environments.

2.6 Collective Data Gathering and Sensor Fusion:

Accurate sense of self in VR improves user experience by increasing the believability of the overall virtual experience. However, user head worn VR display devices aren't generally positioned to optimally track the users body, hands, feet etc., due to the generally limited field of view resulting from the geometric constraints of sensors worn on a user's head. For example, when using only sensors in the display device worn by the user, typical VR systems may lose sight, and thus the ability to model, user hand motions and gestures, depending upon movement of the users head (and thus of the attached display device) and movement of the users hands relative to the field of view of any sensors attached to the display device.

Consequently, in many VR simulations, user's hands are not accurately tracked when those hands are not in the field of view of sensors tied to the users own VR display device. This can lead to concerns such as missing user gesture-based commands and delays in resynching hand models to the real-world position of the user's hands when those hands come back into the field of view of the model takes time to calibrate when hands come back into view of the sensors tied to the users own VR display device. Similarly, in many VR simulations, user skeletal tracking is significantly degraded or simply not done in cases where tracking is performed for particular users based on the sensors tied to the users own VR display device. As such, typical VR simulations do not accurately render the user's body in the simulation. It has been observed that not displaying a user's body in a VR simulation can be highly disorienting to users.

In various implementations, the STIVE generator addresses such concerns by implementing a unified tracking system that performs a sensor fusion process based on available sensor data from sensors tied to each user's VR display device, user body worn sensors, and any additional sensors positioned throughout the shared real-world space. This sensor fusion process enables the STIVE Generator to maintain a unified model for all users and non-participants in the scene, including position, orientation, skeleton and hand models. A sense of self in the shared virtual environment is highly useful in increasing user perception that the user is actually the environment represented by the shared immersive virtual environment. Advantageously, the unified tracking and modeling allows the STIVE Generator both to render the participants to each other as in-simulation characters, and to perform self-rendering of each user from their individual points of view. The result of this unified tracking and modeling is an increased sense of self of all users that improves user experience within the shared immersive virtual environment.

More specifically, by applying each user's sensors to track other users throughout the room (as illustrated with respect to FIG. 3, discussed previously), a generally wider field of view of the other users allows the sensors associated with each user to accurately track and provide sensor information for modeling one or more other users. Further, sensors information from multiple users or from fixed or mobile sensors in the shared real-world space can be combined to build accurate hand tracking and skeleton models of all users so that virtual representations or avatars of those users can be rendered into each user's individual view of the shared immersive virtual environment.

Further, the unified tracking and modeling performed by the STIVE Generator provides additional benefits with respect to active users (and non-participants) that are co-located within the shared real-world environment while user are participating in the shared immersive virtual environment. For example, close hand and body tracking of multiple users enabled by this the unified tracking and modeling supports increased accuracy in gesture recognition (e.g., user makes hand gesture corresponding to particular command) for initiating computer input for interaction or control purposes within the shared immersive virtual environment. Further, while users are participating in the shared immersive virtual environment, such gesture-based commands may be used to interact with real-world communication devices, real-world computing devices, etc., in the shared real-world space or otherwise accessible via wired or wireless communications technologies to users in the shared real-world space.

Facial expressions of users are tracked and modeled by various implementations of the STIVE generator. As such, the unified tracking and modeling performed by various implementations of the STIVE generator enables accurate and complete representations or virtual avatars of users to be rendered into the shared immersive virtual environment. In particular, this tracking and modeling enables accurate real-time virtual representations of the hands and bodies of other users and the expressions of those users to be visible to any users looking in the direction of other users while participating in the shared immersive virtual environment.

In view of the computing power used to track and model multiple users in this way, in various implementations, the sensor information from all of the sensors is transmitted in real-time to a local or remote central computing node (or distributed real-time computational resources) that performs a sensor fusion process to integrate the multiple sensors relative to the aforementioned global coordinate system and to perform the tracking and modeling. The result of this process are temporally smooth body, hand and facial expression models for each user (and non-participants) that are accurately located relative to real-user positions and motions within the shared real-world space and that are accurately mapped to the corresponding shared immersive virtual environment. This tracking and modeling information is then passed to a real-time rendering component that renders corresponding virtual representations or virtual avatars of each user (and optionally non-participants) into the shared immersive virtual environment.

As such, when a user looks down at his own body, he sees virtual representations of his own torso, arms, hands, legs, feet., etc., that accurately track the user's actual motions. Similarly, when the user directs his gaze across the room (or other space) the virtual representations of the other users are similarly accurate. These virtual representations do not necessarily have the same size, texture, coloring etc., as that of the user's real body. For example, the user (or some design component of the shared immersive virtual environment) may choose or direct rendering of an avatar of the user as a blue translucent humanoid covered with fur. Further, since each user is presented with his own view of the shared immersive VR, user's may be presented with modified versions of the shared immersive VR wherein they may appear one way to themselves, and as different virtual characters or avatars to one or more other users.

Advantageously, the accuracy of the unified tracking and modeling enabled by integrating multiple sensors tied to multiple users tends to improve (to a point) as more real users are added to the shared immersive VR. In particular, the increased number of sensors associated with the VR display devices worn by those users tends to increase the accuracy of the tracking and modeling of all of the other users. One interesting use of these tracking and modeling features is to apply the unified tracking and modeling to render the users (and optionally other non-participants) as in-simulation characters within the shared immersive virtual environment that are visible to all of the users.

2.7 User Safety:

In a typical virtual environment, the user is completely detached from real world and its obstacles since the real-world environment around the user is not visible to the user. Consequently, using a VR display device in a cluttered room may be potentially risky. For example, a single misstep by the user can make him bump him into an object, surface or person he cannot see. Further, as noted above, multiple users may be participating in immersive virtual environments in the same real-world space as other people and both static and dynamic objects. As such, because the real-world environment is not visible to these users, there is a potential risk of inadvertent contact, tripping hazards, etc., resulting from user movement and hand and body motions within the real-world space. Further complicating the issue is that people tend to move around, make noise, and perform actions that can interrupt the shared immersive virtual environment of particular users, or do other things that may be unsafe.

Consequently, in various implementations, the shared immersive virtual environment is rendered in a way that enhances user safety without interfering with the overall experience presented by the shared immersive virtual environment. In general, user safety is enhanced by rendering any combination of audio and visual cues or other indicia of safety that are optionally consistent with an overall theme of the shared immersive virtual environment to help the user avoid inadvertent contact with other people and both static and dynamic obstacles.

For example, real-world objects or obstacles between users can be rendered into the shared immersive virtual environment as impassible objects or geography (e.g., barbed wire, chasms, briar patch, moat, etc.). Similarly, non-participants in close proximity to users may appear as ghosts, solid outlines, static or dynamic virtual objects, etc. Moreover, with simple audio processing, the STIVE Generator can detect if a non-participant is attempting to speak to a user and render that non-participant more corporeal within the shared immersive virtual environment to draw the user's attention. Similarly, renderings of a non-participant may become more corporeal as any user approaches a position of the non-participant. In other words, a partially translucent rendering of a non-participant person within the real-world environment can increase in solidity as the non-participant speaks, or when any user approaches that translucent rendering (and thus the real-world position of the non-participant).

2.7.1 Rendering Safe to Walk Zones:

As noted above, in various implementations, the STIVE generator renders various indicia of safety into the shared immersive virtual environment to improve user safety while users move about within the shared real-world space (which is not visible while users are participating in the shared immersive virtual environment. A simple example of such indicia of safety is to render a "safe-to-walk" path of the like within the shared immersive virtual environment. For example, a glowing path or overlay may be rendered into the shared immersive virtual environment. This safe-to-walk path is rendered in real-time in response to user and non-participant motions and positions, and the motions and positions of other objects, within the shared real-world space. Consequently, the safe-to-walk path may change dynamically as people or objects move into that path. Further, those people or objects may also be rendered into the shared immersive virtual environment (e.g., avatar of another user, etc.,) so that the user will see a digital representation of the other person. This will enable the user to avoid inadvertent contact with that other person regardless of whether a safe-to-walk path is also rendered into the shared immersive virtual environment.

When users are in different physical positions or orientations within the shared real-world space, different users may see different highlighted paths and different warning indicators or other indicia of safety, even when they are participating in the same shared immersive VR. For example, if a real cat is crossing in front of a particular user, a rendering of that cat, or some other indicia of safety, may be rendered so that the user doesn't accidently kick, step on, or trip over that cat. However, other users that are not near enough to make potential inadvertent contact with the cat may be viewing the same immersive virtual environment, but without any indicia of safety relating to that cat. In other words, some users may be aware of the cat since it is somehow rendered into their personal view of the shared immersive virtual environment, while other users may not be aware of the cat since it is not rendered into their personal view of the shared immersive virtual environment.

Further, as noted above, the STIVE generator tracks and models each user's head, hands, legs, feet, etc. Thus, in various implementations, alternatively or in addition to rendering safe-to-walk paths or the like, the STIVE generator optionally highlights dangerous areas (or other areas of potential inadvertent contact) that are within a certain radius around the user or areas in the general direction of travel of the user.

More specifically, since the user's movement (or movement of other objects or people) within the shared real-world space corresponds with movement in the virtual world, the STIVE generator presents the shared immersive virtual environments to the user in a way that increases the safety of the user. For example, in order to mark or highlight safe areas for users to walk, various implementations of the STIVE Generator detect the floor of the shared real-world space by detecting large horizontal planar surfaces near the "bottom" of the scene (which may be classified as a floor). The STIVE Generator then performs scene completion computations of the floor to fill in occluded areas (e.g., part of the floor visible to a particular sensor may be blocked by a table, another person, etc.).

In various implementations, the STIVE Generator then creates a set of complex polygons (or other non-convex shapes that may contain holes) that represent "safe" areas of the floor and provide them as part of the SOM for use in real-time rendering of the shared immersive virtual environment. The STIVE Generator then applies the SOM to render safe-to-walk paths as a visible pathway, a glowing part of the floor or by any other means. For example, less intrusive methods for alerting the user to potential inadvertent contact include simulating a force field within the shared immersive virtual environment. For example, I various implementations, as the user moves close to an obstacle, a particle effect starts to highlight the outlines of the obstacle. In combination, a humming or buzzing sound (like an electric field) may begin and increase in intensity, thereby warning the user that he is approaching a danger area or about to make inadvertent contact.

In various implementations, the shared immersive virtual environment is rendered in a way that enables users to naturally avoid inadvertent contact with furniture and other obstacles, regardless of whether that furniture or other obstacles are integrated into or otherwise rendered into the shared immersive virtual environment. In particular, the geometry of the room or other shared real-world space is reconstructed from any combination of prior and real-time scans of that space. These scans are also used to perform various scene understanding applications that provide a semantic understanding of that space to derive object- and surface-level knowledge (e.g., a particular obstacle is a sofa, a door, a table, etc.). This semantic information is then relayed to the STIVE Generator via the SOM and is used to enhance safety via rendering of appropriate indicia of safety into the shared immersive virtual environment relative to the particular movement, position, and field of view of each user.

In the case that a user is moving in a direction in which they are not looking (e.g., moving sideways or backwards), the STIVE Generator may generate real-time audio alerts. Examples of these types of audio alerts include, but are not limited to a buzzing sound increasing in intensity, or beeps increasing in frequency, as a user gets closer to inadvertent contact in the real-world environment. Similarly, a simple speech string may be presented to the user such as, for example, "Hey, watch where you're going!"

In some cases, rendering virtual content into the shared immersive virtual environment may be disruptive to the overall VR simulation. However, as noted above, the SOM includes information that provides the STIVE generator with a semantic understanding of the shared real-world space. This provide an object-level understanding that enables the STIVE Generator to render complete objects that are within a certain radius of the user (e.g., a whole chair rather than simply a part of real chair that the user is about to bump into). Similarly, virtual objects having similar functionality to real-world objects may be rendered into the shared immersive virtual environment in a way that is both mapped to the physical locations of those real-world objects and in a way that is generally consistent with those real-world objects. For example, in the case of a shared virtual environment appearing as a forest, a real-world couch may be rendered as a fallen log or other seating surface. In this way, the user can both avoid the couch and use the couch as a seating surface even though the user only sees the virtual fallen log.

Figure 5:
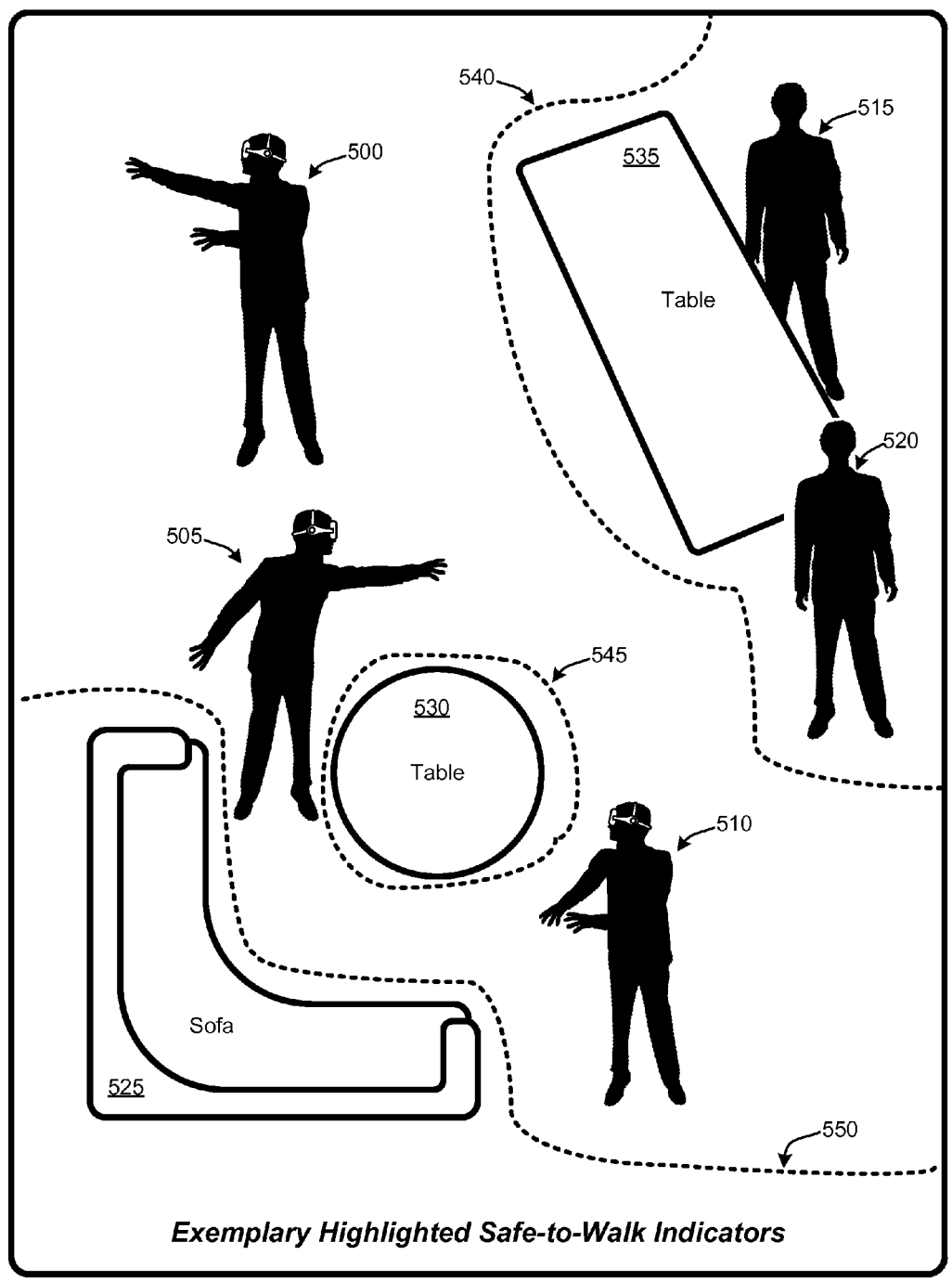
FIG. 5 illustrates an exemplary implementation of a rendering of "safe-to-walk" indicators that are rendered into a shared immersive VR environment for effecting various implementations of the STIVE Generator, as described herein.

FIG. 5 provides a simple example, of rendering "safe-to-walk" indicators into a shared immersive VR environment. In this example, three users (500, 505 and 510) are participating in a shared immersive virtual environment in a real-world space that includes two non-participants (515 and 520) and various real furniture including a sofa 525, a first table 530, and a second table 535. In this example, indicia of safety are rendered into the shared immersive virtual environment as broken glowing lines (540, 545 and 550) on the floor. Then, so long as users don't cross those indicia of safety, they will avoid inadvertent contact with the furniture and non-participants in the room.

2.7.2 Non-Participant Rendering and Interactions:

As noted above, the shared real-world space may include various combinations of users and non-participants. In some cases, interactions between users and persons not sharing the immersive virtual environment are enabled by various implementations of the STIVE Generator. Alternately, or in combination, digital avatars of virtual characters may be mapped to the positions of the non-participants. In other words, people in the room who are not active participants in the shared immersive virtual environment may be tracked by position and motion, and if possible, using skeleton tracking. Applying this type of tracking and modeling enables the STIVE Generator to fit non-participant position and skeleton to in-simulation characters that can feel more natural.

For example, given the aforementioned unified tracking and modeling features and capabilities of the STIVE Generator, position and skeleton tracking of non-participants may be used to render non-participants as ghosts in a haunted mansion, human-shaped outlines, zombies, faceless humanoid forms, peasants in a medieval setting, admiring fans in a crowd, etc. Further, in various implementations, the STIVE generator may render audio content (e.g., sounds, speech content, etc.) tied to the position of these virtual characters in a way that makes them appear to be more consistent with the overall shared immersive virtual environment. In other words, non-participants may be rendered into the shared immersive VR as virtual characters or highlighted in some way such that users in the shared immersive VR will know where those other real people are, but in a way that is not disruptive to the underlying shared immersive VR. In the same way as when users approach real-world objects where unintended contact is likely to occur, for safety reasons, highlighting or warning indicia may increase in intensity as users approach non-participants in the shared real-world space.

2.8 Shared Tactile Interaction:

One of the features of the STIVE Generator that significantly improves user experience and sense of self and realism within the shared immersive virtual environment is the ability to share tactile feedback and interaction between multiple users. This can range from moving within the same virtual environment (mapped from the real world) to multiple people handling a specific virtual object that is mapped to some real-world object (e.g., see FIG. 1, discussed above). Advantageously, physically touching, manipulating, or otherwise handling or sharing real-world objects (that appear as virtual objects) with other users within the shared immersive virtual environment improves user interaction and overall sense of realism with respect to the shared immersive virtual environment.

In other words, users may move independently within the same shared immersive virtual environment that is mapped to shared real-world space (e.g., virtual representations of real surfaces and objects in the shared real-world space rendered into the shared immersive virtual environment). Actual physical objects can be rendered into the shared immersive virtual environment. Similarly, real-world physical proxies that are rendered to appear as different or enhanced virtual objects in the shared immersive virtual environment can be used. This allows users to physically pass virtual objects to each other by passing some real object (not visible in the shared immersive virtual environment) that is mapped to the position of the virtual object that is visible to the users. As a result, users have the sensation (i.e., tactile and visual feedback) of physically interacting with virtual objects via the underlying real-world objects that are not visible to the user but to which the virtual objects are mapped and rendered in real-time.

For example, a real-world inert plastic rectangular shape can be rendered into the shared immersive virtual environment as a virtual display device or tablet computer that displays dynamic content within the shared immersive virtual environment. Even though the users are actually passing and interacting with a real-world inert piece of plastic, the users can virtually interact with the content displayed on the virtual display device or tablet computer within the shared immersive virtual environment via gesture-based controls, detection of touch events via real-world hand tracking, speech-based controls or inputs, etc.

In other words, the STIVE Generator can use any real-world objects and shapes by mapping and rendering virtual objects in the place of those real-world objects for use within the shared immersive virtual environment. However, in various implementations, multiple real-world predefined inert shapes and objects are provided for use with the STIVE Generator. These inert shapes and objects may be keyed to a particular simulation. In various implementations, these inert shapes and objects may be made from relatively safe materials (e.g., soft plastic, rubber, foam, etc.) in any desired shape or size. The STIVE Generator can then map and render any corresponding virtual content to those inert shapes and objects within the shared immersive virtual environment for shared use and interaction between users. Further, real-world objects can be virtually skinned beyond their physical extents, with the actual physical extents being highlighted or differentiated in some way to alert the user as to portions of virtual objects that can actually be physically handled while the user.

2.8.1 Multiple User Considerations and Tactile Interaction Scenarios:

The STIVE Generator enables two or more people co-located in a real-world environment, each wearing a HMD or other VR display device to participate in a shared immersive virtual environment with shared tactile experiences. In general, a tactile experience in the shared immersive virtual environment involves real-world physical objects that appear as virtual elements of the shared immersive virtual environment that may be physically touched and manipulated by one or more of the users. However, in various implementations, the tactile feedback provided by the STIVE Generator includes indirect effects including, but not limited to, temporary or continuous gusts of wind blown from directional fans or vents, temperature changes, via HVAC systems controlled by the STIVE Generator, to simulate various environments, e.g., apply AC to reduce temperature for simulated artic environments or heat up room for simulated desert environments, etc.

Once of the features that improve user experience is the ability to share physical handling and contact of physical objects that are rendered into the shared immersive virtual environment, either as virtual analogs of those physical objects or some different virtual object or element that, in either case, is mapped to the physical location of the physical object. Having a physical object present in the shared immersive virtual environment, such that two or more parties can handle that physical object enables a wide range of virtual scenarios when the users are co-located in the shared immersive virtual environment.

For example, consider two users in the shared immersive virtual environment tossing a real ball back and forth. In this case, the real ball, and the users, may be mapped and rendered into the shared immersive virtual environment as any desired virtual element or characters. For example, the users and ball may be rendered to appear in the shared immersive virtual environment as two titans throwing around the earth, two monsters passing or tossing a flaming car, two ants throwing around a grain of rice, etc. Clearly, such concepts may be extended to more than two users and more than a single physical object.

As another example, consider two or more furniture designers (or any designers of something physical). Given a 3D model of a virtual object mapped to some real-world physical object or proxy, the users can interact with the design of an existing prototype. For example, each of the users can see a rendered virtual object mapped to the real object or proxy, and can physically turn it around, touch it, etc. . . Further, users may change parameters or characteristics (e.g., shape, texture, color, etc.) of the 3D model of the virtual object via verbal inputs, gesture-based inputs, or other Natural User Interface (NUI) inputs. The simulation that is mapped and rendered onto the real-world physical object is then dynamically updated in response to any changes directed by the collaborative user input.

In various implementations, the STIVE Generator enables real-world objects to be used as controls to drive various components of the shared immersive virtual environment. For example, consider two users sitting at a table with a real chess board and chess pieces between them. User movement of these chess pieces may then the simulation being rendered as the shared immersive virtual environment. For example, the users in the shared immersive virtual environment may see a rendering of themselves on a cloud floating above a battlefield, while moving their chess pieces causes parts of their virtual army to engage the virtual enemy army of the other user. In response, the shared immersive virtual environment may display are rendering of those armies either fighting and winning or losing horribly depending on any engagement rules (e.g., standard chess rules or any other rules) associated with the simulation.

Tracking of physical objects and users within the shared immersive virtual environment enables a wide of control scenarios and enhancements. For example, consider a standard control device, such as a remote control or a game controller, which may be rendered into the shared immersive virtual environment to appear a virtual representation of the real control device or as some other virtual object. In the case that two or more users are sharing one control device, physically passing that control device from user to another may be interpreted as a control indication for passing overall control of the shared immersive virtual environment from one user to another.

In addition to sharing tactile interactions based on virtual elements or objects mapped and rendered to real-world proxies in the shared immersive virtual environment, actual physical contact between users is clearly possible. Further, such contact may also be used for various control purposes. It has been observed that lack of human contact or touch may be an alienating factor in virtual reality environments. As such, the capability of the STIVE Generator to provide shared immersive virtual environments in which multiple users may physically touch and interact with physical objects and with other users significantly enriches the shared immersive virtual environment by improving user sense of realism and presence within the shared immersive virtual environment.

User touch may be used for simple user interaction or for simulation control purposes. For example, users holding or touching each other's hands may be used as an NUI input to signify passing control from one user to another or ending a turn of one user to control the shared immersive virtual environment. Alternately, user touch can be used for other purposes such as, for example, getting the attention of another user in a non-verbal manner, such as by tapping the user's arm or shoulder him and pointing at something being rendered in the shared immersive virtual environment. Similarly, this type of touch enables one user to lead or guide another user by holding or pushing his shoulders, arm, hand, etc., while participating in the shared immersive virtual environment for a variety of purposes, such as, for example, navigating or avoiding real or virtual obstacles, traversing a real or virtual maze, etc. Touch between users may also be used for other purposes, such as parents holding hands or hugging their children to assure them of their presence while either or both are participating in the shared immersive virtual environment.

2.8.2 Exemplary Educational Scenarios for the STIVE Generator:

In various implementations, STIVE Generator provides an educational tool for enhancing teacher, student and user learning and efficiency. For example, consider a real-world class of physics with students participating as users of a corresponding real-time shared immersive virtual environment. In this example, the professor, also participating as a user of the corresponding real-time shared immersive virtual environment, can manipulate virtual objects in real-time map a physical ball (or other real-world object) to an expanded virtual atom in the shared immersive virtual environment. The virtual atom can then be expanded to show electrons, protons, neutrons, (e.g., expand an atom to show electron shells, demonstrate magnetic fields, etc.) while every student user has an unobstructed virtual front row seat regardless of where the students are in the shared real-world space and regardless of how many students may be in that shared real-world space. Further, the physical ball, and thus the mapped virtual expanded atom may be held in the professor's hand and rotated to show or expand particular features of the atom. Further, the physical ball, and thus the mapped virtual expanded atom, may be physically passed to and between students participating in the shared immersive virtual environment. The participants in the shared immersive virtual environment will see (and feel) the virtual expanded atom that they are holding (and manipulating, if desired) without seeing the real-world physical ball since it hasn't been rendered into the shared immersive virtual environment.

Consider another educational example regarding fluid dynamics. Imagine a virtual river (or other fluid, gas, or plasma) flowing in a virtual channel mapped to the surface of a real table in the shared real-world space. In this case, the real table in the shared real-world space may or may not be rendered into the shared immersive virtual environment, or it may be rendered as some other surface or terrain. Then, one or more real objects (e.g., spheres, cubes, planes, etc.) may be mapped and rendered into the shared immersive VR. The corresponding virtual objects can then be physically picked up (since the virtual objects are mapped to corresponding real objects) and placed into the virtual river (or other flow) to virtually demonstrate changes in flow patterns resulting from objects placed into the virtual flow.

Similar examples exist with respect to airflow over wing surfaces. Users may participate in a shared immersive virtual environment corresponding to the interior of a supersonic wind tunnel. Given a physical wing analog mapped to various virtual airplane or wing shapes, users can then manipulate virtual wing shapes, orientations, angles of attack, etc., relative to a visible virtual supersonic airflow to observe virtual airflow over the wing shape, virtual formation of shock waves, virtual turbulence, virtual vortices, etc. Further, such virtual flow effects can be magnified, sped up, slowed down, etc., within the shared immersive virtual environment to enable examination of such effects at any desired level of magnification or temporal reality. Further, users can move around within the shared real-world space to observe the resulting shared immersive virtual environment from different points of view.

Consider another example involving multiple students standing inside a shared immersive virtual environment of our solar system. One of the students asks what happens to the orbits of other planets if the orbit of Jupiter changes. A physical analog of the planet Jupiter (mapped to a virtual rendering of Jupiter) can then be moved to any desired position within the virtual representation of the solar system. The time scale can then be adapted to any desired speed (e.g., thousands of years per second) to show how the orbits of other planets in the virtual solar system change over time in response to moving the orbit of Jupiter. Students can also zoom into particular sections of the virtual solar system (e.g., Kuiper Belt objects) to see how moving or removing Jupiter may affect those sections of the solar system.

Further, each participant in a shared immersive virtual environment may see a slightly different version of the shared real-world space. For example, returning to the example of the virtual atom in a shared immersive virtual environment. Every student may have a physical ball or some other real-world object (i.e., a physical proxy) that is mapped and rendered as the virtual atom in the particular student's field of view within the shared immersive virtual environment. In this case, the professor may make some particular point, and then allow each student to individually virtually explore properties of the atom by manipulating the physical proxy. Students may then ask questions of particular observations and the virtual view of that student's virtual atom may be transferred to the views of the other students and the professor so that everyone can see what the student is asking about.

2.9 Flexible Mapping and Scaling in the Shared Virtual Environment:

Although the most natural mapping of multiple users co-located in a real-world space is maintaining the exact distance and orientation between them when rendering them into the shared immersive virtual environment, in some situations it is possible to be more flexible. For example, consider two users on opposite sides of a real-world obstacle such as a table. The rendering of these users can be made to appear as if they are situated on opposite sides of a deep virtual chasm, with a virtual distance between them scaled appropriately. In other words, even if the users are actually only a few feet apart, they may appear to each other as being a great distance apart across the virtual chasm. Although they would still be able to hear each other, they would be expected not to cross the chasm.

Similarly, the STIVE Generator can scale virtual representations of users or other objects. For example, assume that a first user is standing on the opposite side of a real table (in the shared real-world space) from a second user. Even if those users are only a few feet apart, the virtual representations of each user that is presented to the other user may be scaled to make the users appear either further or closer (or larger or smaller) to each other than they are in the real-world space. For example, given the example of two users on opposite sides of a real table, those users could be rendered to each other into the shared immersive virtual environment as being very far apart and across a deep virtual chasm from each other. In other words, in various implementations, the geometry and environment of the shared real-world space may have little or no relation to the geometry and environment being presented in the shared immersive virtual environment.

Similarly, in various implementations, real user motions may be scaled relative to the scaling of the perceived virtual distances or sizes. For example, a user may perceive the virtual representation or avatar of another user (who is only 10 feet away in the shared real-world space) as being 100 feet away in the shared immersive virtual environment. Then, for each step one user takes towards the user, the virtual distance covered by each step may be magnified (e.g., by a factor of 10), so that it appears in the shared immersive virtual environment as if the user is taking gigantic steps as he approaches the other user. Then, when users are close to each other in the shared real-world space, motions such as steps towards each other can be scaled to match the actual real-world distances.

Figure 6:
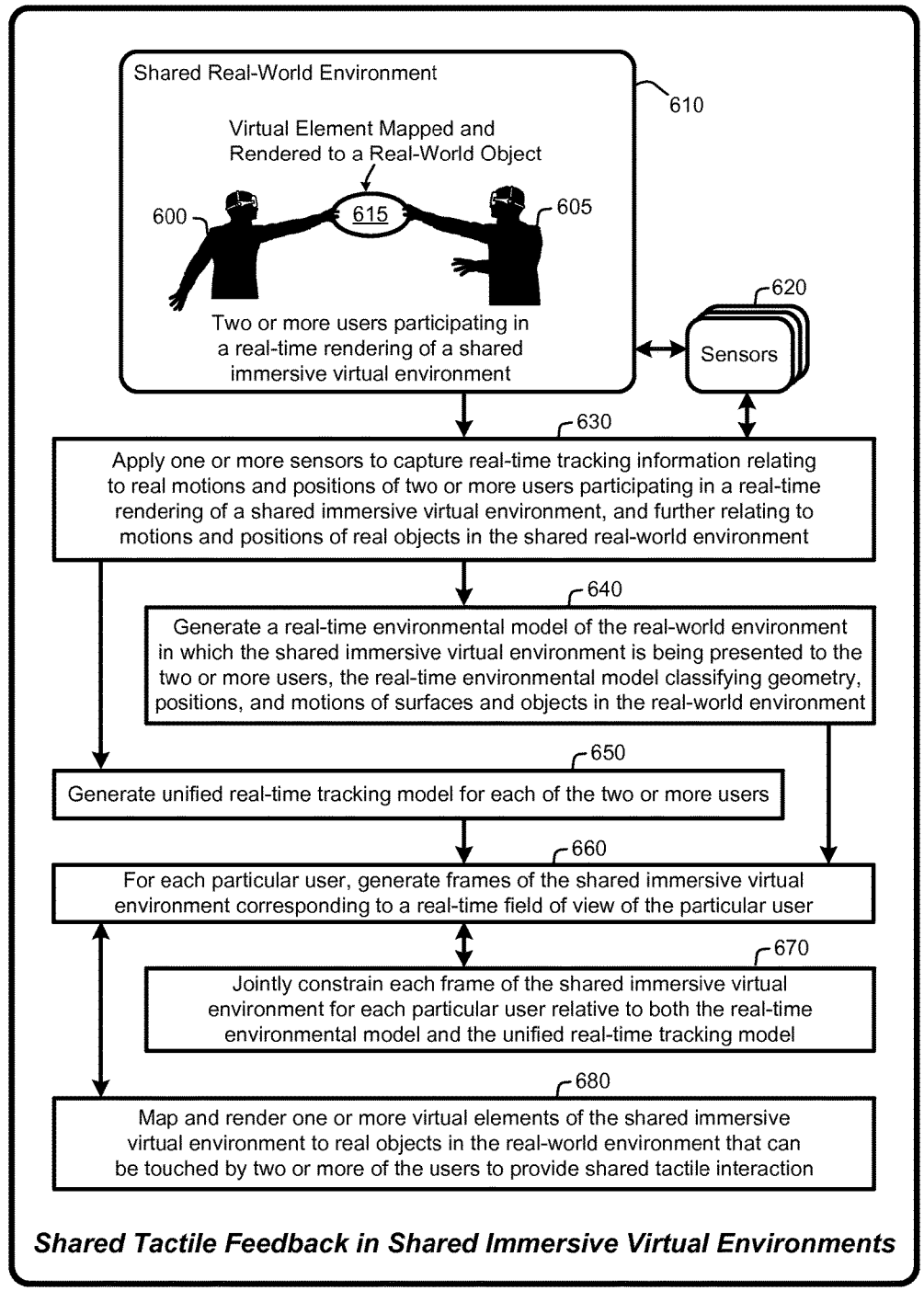
FIG. 6 illustrates a general system flow diagram that illustrates exemplary methods for effecting various implementations of the STIVE Generator, as described herein.

3.0 Operational Summary of the STIVE Generator:

The processes described above with respect to FIG. 1 through FIG. 5, and in further view of the detailed description provided above in Sections 1 and 2, are illustrated by the general operational flow diagram of FIG. 6. In particular, FIG. 6 provides an exemplary operational flow diagram that summarizes the operation of some of the various implementations of the STIVE Generator. FIG. 6 is not intended to be an exhaustive representation of all of the various implementations of the STIVE Generator described herein, and that the implementations represented in FIG. 6 are provided only for purposes of explanation.

Further, any boxes and interconnections between boxes that are represented by broken or dashed lines in FIG. 6 represent optional or alternate implementations of the STIVE Generator described herein, and that any or all of these optional or alternate implementations, as described below, may be used in combination with other alternate implementations that are described throughout this document.

In general, as illustrated by FIG. 6, the STIVE Generator begins operation by applying (630) one or more sensors 620 to capture real-time tracking information relating to real motions and positions of two or more users (600, 605) participating in a real-time rendering of a shared immersive virtual environment, and further relating to motions and positions of real objects in a shared real-world environment 610.

The STIVE Generator applies the real-time tracking information to generate (640) a real-time environmental model of the real-world environment 610 in which the shared immersive virtual environment is being presented to the two or more users (600, 605). This real-time environmental model serves to classify geometry, positions, and motions of surfaces and objects in the real-world environment 610. In addition, the STIVE Generator applies the real-time tracking information to generate (650) a unified real-time tracking model for each of the two or more users (600, 605).

Given these models, the STIVE Generator then generates (660) frames of the shared immersive virtual environment for each particular user (600, 605) that correspond to a real-time field of view of the particular user. In particular, when generating these frames, the STIVE Generator jointly constrains (670) each frame of the shared immersive virtual environment for each particular user (600, 605) relative to both the real-time environmental model and the unified real-time tracking model. In addition, the shared immersive virtual environment is further customized to the real-world environment (610) by mapping and rendering (680) one or more virtual elements of the shared immersive virtual environment to a real object 615 in the real-world environment (610) that can be touched by two or more of the users (600, 615) to provide shared tactile interaction.

4.0 Exemplary Implementations of the STIVE Generator:

The following paragraphs summarize various examples of implementations that may be claimed in the present document. The implementations summarized below are not intended to limit the subject matter that may be claimed in view of the detailed description of the STIVE Generator. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the STIVE Generator is implemented by means, processes or techniques for rendering and presenting fully immersive shared virtual VR environments in which multiple users in a shared real-world space share tactile interactions and touch within the shared immersive virtual environment. Shared tactile interactions and touch within the shared immersive virtual environment significantly improves user experience and sense of self and realism within the shared immersive virtual environment. In various implementations, this shared tactile interactions and touch includes, but is not limited to, moving within the same virtual environment that is mapped from the real world, multiple users handling a specific virtual object that is mapped to some real-world object, physical contact between users, etc.

As a first example, in various implementations, a computer-implemented process is implemented via means, processes or techniques for constructing shared virtual environments by applying a computer to generate a real-time environmental model of a real-world environment in which a shared immersive virtual environment is being presented to two or more users. In various implementations, the real-time environmental model classifies geometry, positions, and motions of surfaces and objects in the real-world environment. In addition, in various implementations, the computer-implemented process generates a unified real-time tracking model for each of the two or more users. Further, for each particular user, the computer-implemented process generates frames of the shared immersive virtual environment corresponding to a real-time field of view of the particular user. Each frame of the shared immersive virtual environment for each particular user is jointly constrained relative to both the real-time environmental model and each of the unified real-time tracking models. In addition, the computer-implemented process maps and renders one or more virtual elements of the shared immersive virtual environment to real objects in the real-world environment that can be touched and manipulated by two or more of the users to provide shared tactile interaction.

As a second example, in various implementations, the first example is further modified via means, processes or techniques for generating the unified real-time tracking model such that it comprises one or more of user position, user orientation, user skeleton models and user hand models.

As a third example, in various implementations, any of the first example and the second example are further modified via means, processes or techniques for generating the unified real-time tracking model such that it includes user facial expression modeling.

As a fourth example, in various implementations, any of the first example, the second example, and the third example are further modified via means, processes or techniques for rendering virtual representations of each user into the shared immersive virtual environment in positions corresponding to a real-world position of each user.

As a fifth example, in various implementations, any of the first example, the second example, the third example and the fourth example are further modified via means, processes or techniques for rendering virtual representations of one or more non-participant persons into the shared immersive virtual environment in positions corresponding to a real-world position of each non-participant person.

As a sixth example, in various implementations, any of the first example, the second example, the third example, the fourth example, and the fifth example are further modified via means, processes or techniques for rendering one or more indicia of safety into the shared immersive virtual environment.

As a seventh example, in various implementations, any of the first example, the second example, the third example, the fourth example, the fifth example and the sixth example are further modified via means, processes or techniques for rendering of an indication of a safe path within the shared immersive virtual environment that is clear of real-world obstacles.

As an eighth example, in various implementations, any of the first example, the second example, the third example, the fourth example, the fifth example, the sixth example, and the seventh example are further modified via means, processes or techniques for generating a translucent rendering of a non-participant person within the real-world environment that increases in solidity as any user approaches that translucent rendering.

As a ninth example, in various implementations, any of the first example, the second example, the third example, the fourth example, the fifth example, the sixth example, the seventh example and the eighth example, are further modified via means, processes or techniques for presenting one or more of the virtual representations of one or more non-participant persons as a translucent rendering that increases in solidity whenever it is determined that the non-participant person is speaking to any user.

As a tenth example, in various implementations, any of the first example, the second example, the third example, the fourth example, the fifth example, the sixth example, the seventh example, the eighth example, and the ninth example, are further modified via means, processes or techniques for interacting with one or more virtual elements of the shared immersive virtual environment via one or more gesture-based commands performed by one or more of the users.

As an eleventh example, in various implementations, any of the first example, the second example, the third example, the fourth example, the fifth example, the sixth example, the seventh example, the eighth example, the ninth example, and the tenth example, are further modified via means, processes or techniques for presenting the shared immersive virtual environment to each user via a virtual reality display device that completely replaces any view of the real-world environment with the shared immersive virtual environment.

As a twelfth example, in various implementations, a system is implemented via means, processes or techniques for constructing interactive shared virtual reality environments by adapting a computing device to apply one or more sensors to capture real-time tracking information relating to real motions and positions of two or more users participating in a real-time rendering of a shared immersive virtual environment, and further relating to motions and positions of one or more real objects in the shared real-world environment. In various implementations, this system applies the tracking information to generate a real-time environmental model of the real-world environment, the real-time environmental model representing a semantic understanding of surfaces and objects within the real-world environment. In various implementations, this system applies the tracking information to generate a real-time position and skeleton model for each of the two or more users. In various implementations, this system then generates frames of the shared immersive virtual environment that are tailored to corresponding real-time field of view of each user. Each frame of the shared immersive virtual environment is jointly constrained for each particular user relative to both the real-time environmental model and each of the real-time position and skeleton models. Further, in various implementations, this system maps and renders one or more virtual elements of the shared immersive virtual environment to one or more of the real objects in the shared real-world environment. In various implementations, this system then presents the shared immersive virtual environment to each user via a virtual reality display device that completely replaces any view of the real-world environment with the shared immersive virtual environment.

As a thirteenth example, in various implementations, the twelfth example is further modified via means, processes or techniques for applying the tracking information to generate a facial expression model for each user.

As a fourteenth example, in various implementations, any of the twelfth example and the thirteenth example are further modified via means, processes or techniques for rendering virtual representations of each user into the shared immersive virtual environment in positions corresponding to a real-world position of each user, each virtual representation including real-time facial expressions of each corresponding user.

As a fifteenth example, in various implementations, any of the twelfth example, the thirteenth example, and the fourteenth example are further modified via means, processes or techniques for rendering virtual representations of one or more non-participant persons into the shared immersive virtual environment in positions corresponding to a real-world position of each non-participant person.

As a sixteenth example, in various implementations, any of the twelfth example, the thirteenth example, the fourteenth example, and the fifteenth example are further modified via means, processes or techniques for rendering one or more indicia of safety into the shared immersive virtual environment to alert users as to potential unintended contact with real objects in the shared real-world environment.

As a seventeenth example, in various implementations, any of the twelfth example, the thirteenth example, the fourteenth example, the fifteenth example, and the sixteenth example are further modified via means, processes or techniques for detecting one or more gesture-based commands performed by one or more of the users for use in interacting with one or more virtual elements of the shared immersive virtual environment.

As an eighteenth example, in various implementations, a computer-readable storage device having computer executable instructions stored therein causes a computing device to execute a method for presenting shared immersive virtual environments. This method applies one or more sensors to capture real-time tracking information of users and objects in a shared real-world environment. This tracking information is then applied to generate a real-time environmental model of the real-world environment. The tracking information is also applied to generate a real-time position and skeleton model for each of two or more users. In various implementations, the method generates frames of a shared immersive virtual environment that are tailored to corresponding real-time field of view of each user. Each frame of the shared immersive virtual environment for each particular user are jointly constrained relative to both the real-time environmental model and each of the real-time position and skeleton models. In various implementations, this method maps and renders one or more virtual elements of the shared immersive virtual environment to one or more of the real objects in the shared real-world environment that may be physically touched by multiple users. In various implementations, the method then presents the shared immersive virtual environment to each user via a head-worn virtual reality display device that completely replaces any view of the real-world environment with the shared immersive virtual environment.

As a nineteenth example, in various implementations, the eighteenth example is further modified via means, processes or techniques for rendering one or more indicia of safety into the shared immersive virtual environment to alert users as to potential unintended contact with real objects in the shared real-world environment.

As a twentieth example, in various implementations, any of the eighteenth example and the nineteenth are further modified via means, processes or techniques for detecting one or more gesture-based commands performed by one or more of the users for use in interacting with one or more virtual elements of the shared immersive virtual environment.

Figure 7:
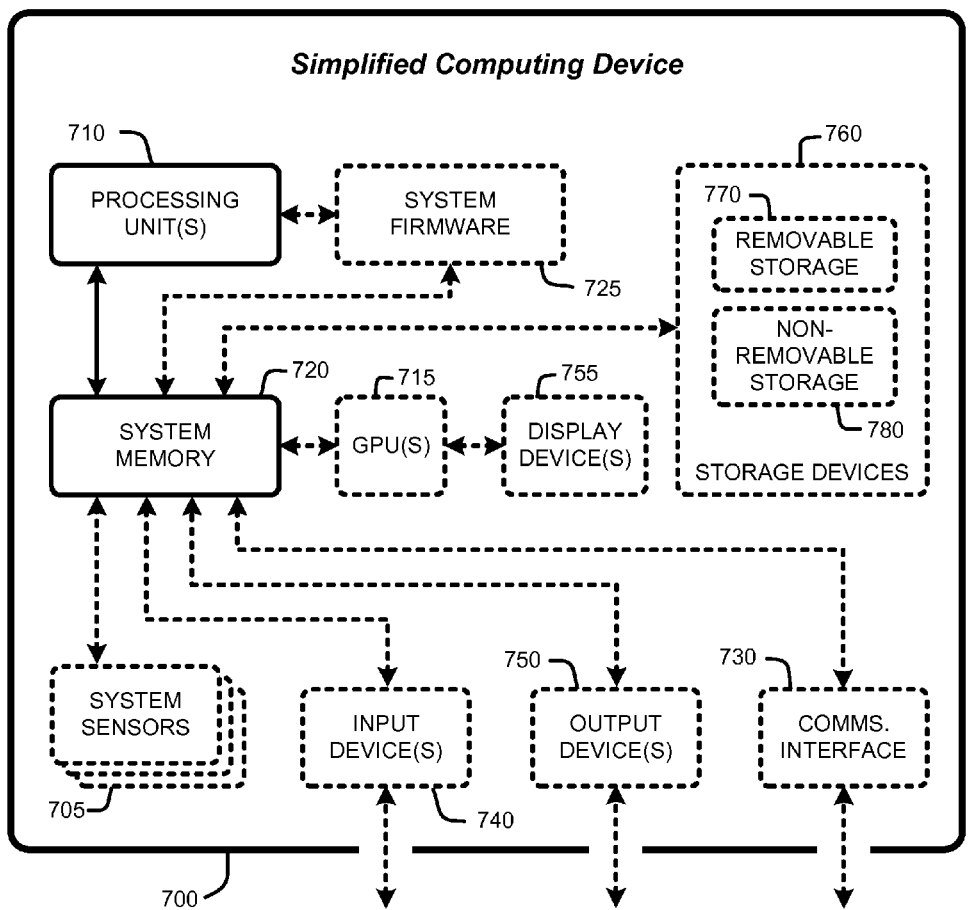
FIG. 7 is a general system diagram depicting a simplified general-purpose computing device having simplified computing and I/O capabilities for use in effecting various implementations of the STIVE Generator, as described herein.

5.0 Exemplary Operating Environments:

The STIVE Generator implementations described herein are operational within numerous types of general purpose or special purpose computing system environments or configurations. FIG. 7 illustrates a simplified example of a general-purpose computer system on which various implementations and elements of the STIVE Generator, as described herein, may be implemented. Any boxes that are represented by broken or dashed lines in the simplified computing device 700 shown in FIG. 7 represent alternate implementations of the simplified computing device. As described below, any or all of these alternate implementations may be used in combination with other alternate implementations that are described throughout this document.

The simplified computing device 700 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the STIVE Generator implementations described herein, the device should have a sufficient computational capability and system memory to enable basic computational operations. In particular, the computational capability of the simplified computing device 700 shown in FIG. 7 is generally illustrated by one or more processing unit(s) 710, and may also include one or more graphics processing units (GPUs) 715, either or both in communication with system memory 720. The processing unit(s) 710 of the simplified computing device 700 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 700 may also include other components, such as, for example, a communications interface 730. The simplified computing device 700 may also include one or more conventional computer input devices 740 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 700 and with any other component or feature of the STIVE Generator, including input, output, control, feedback, and response to one or more users or other devices or systems associated with the STIVE Generator, are enabled by a variety of Natural User Interface (NUI) scenarios. The NUI techniques and scenarios enabled by the STIVE Generator include, but are not limited to, interface technologies that allow one or more users user to interact with the STIVE Generator in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 740 or system sensors 705. Such NUI implementations are also enabled by the use of various techniques including, but not limited to, information derived from system sensors 705 or other input devices 740 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the STIVE Generator.

However, the aforementioned exemplary NUI scenarios may be further augmented by combining the use of artificial constraints or additional signals with any combination of NUI inputs. Such artificial constraints or additional signals may be imposed or generated by input devices 740 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the STIVE Generator.

The simplified computing device 700 may also include other optional components such as one or more conventional computer output devices 750 (e.g., display device(s) 755, audio output devices, video output devices, devices for transmitting wired or wireless data transmissions, and the like). Typical communications interfaces 730, input devices 740, output devices 750, and storage devices 760 for general-purpose computers are well known to those skilled in the art, and will not be described in detail herein.

The simplified computing device 700 shown in FIG. 7 may also include a variety of computer-readable media. Computer-readable media can be any available media that can be accessed by the computing device 700 via storage devices 760, and include both volatile and nonvolatile media that is either removable 770 and/or non-removable 780, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various STIVE Generator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 725, hardware, or any combination thereof to control a computer to implement the disclosed subject matter. The term "article of manufacture" as used herein is intended to encompass a computer program accessible from any computer-readable device, or media.

The STIVE Generator implementations described herein may be further described in the general context of computer-executable instructions, such as program modules, being executed by a computing device. Generally, program modules include routines, programs, objects, components, data structures, and the like, that perform particular tasks or implement particular abstract data types. The STIVE Generator implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the STIVE Generator has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the STIVE Generator. It is intended that the scope of the STIVE Generator be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the STIVE Generator described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A computer-implemented process for constructing shared virtual environments, comprising:
    applying a computer to perform process actions for:
    generating a real-time environmental model of a real-world environment in which a shared immersive virtual environment is being presented to two or more users;
    generating a unified real-time tracking model for each of the two or more users;
    for each particular user, applying the real-time environmental model and the real-time tracking model to generate frames of the shared immersive virtual environment corresponding to a real-time field of view of the particular user;
    rendering virtual representations of one or more non-participant persons into the shared immersive virtual environment in positions corresponding to a real-world position of each non-participant person; and
    presenting the virtual representation of one or more of the non-participant persons as a translucent rendering that increases in solidity whenever it is determined that the non-participant person is speaking to any user.

2. The computer-implemented process of claim 1 wherein each unified real-time tracking model comprises one or more of user position, user orientation, user skeleton models and user hand models.

3. The computer-implemented process of claim 1 wherein each unified real-time tracking model includes user facial expression modeling.

4. The computer-implemented process of claim 1 further comprising process actions for rendering virtual representations of each user into the shared immersive virtual environment in positions corresponding to a real-world position of each user.

5. The computer-implemented process of claim 1 further comprising process actions for rendering one or more indicia of safety into the shared immersive virtual environment.

6. The computer-implemented process of claim 5 wherein one or more of the indicia of safety is represented by a rendering of an indication of a safe path within the shared immersive virtual environment that is clear of real-world obstacles.

7. The computer-implemented process of claim 5 wherein one or more of the indicia of safety is represented by a translucent rendering of a non-participant person within the real-world environment that increases in solidity as any user approaches that translucent rendering.

8. The computer-implemented process of claim 1 further comprising process actions for mapping and rendering one or more virtual elements of the shared immersive virtual environment to one or more real objects in the real-world environment and interacting with one or more of those virtual elements via one or more gesture-based commands performed by one or more of the users.

9. The computer-implemented process of claim 1 further comprising process actions presenting the shared immersive virtual environment to each user via a virtual reality display device that completely replaces any view of the real-world environment with the shared immersive virtual environment.

10. A system for constructing interactive virtual reality environments, comprising:
    a general purpose computing device; and
    a computer program comprising program modules executable by the computing device, wherein the computing device is directed by the program modules of the computer program to:
    apply one or more sensors to capture real-time tracking information relating to real motions and positions in a shared real-world environment of two or more users participating in a real-time rendering of a shared immersive virtual environment, and further relating to motions and positions of one or more non-participant persons in the shared real-world environment;
    apply the tracking information to generate a real-time environmental model of the real-world environment;
    apply the tracking information to generate a real-time position and skeleton model for each of the two or more users and one or more of the non-participant persons;
    apply the real-time environmental model and the real-time position and skeleton models to generate frames of the shared immersive virtual environment that are tailored to a corresponding real-time field of view of each user;
    render virtual representations of one or more of the non-participant persons into the shared immersive virtual environment in positions corresponding to a real-world position of each non-participant person; and
    present the virtual representation of one or more of the non-participant persons as a translucent rendering that increases in solidity whenever it is determined that the non-participant person is speaking to any user.

11. The system of claim 10 further comprising applying the tracking information to generate a facial expression model for each user.

12. The system of claim 11 further comprising rendering virtual representations of each user into the shared immersive virtual environment in positions corresponding to a real-world position of each user, each virtual representation including real-time facial expressions of each corresponding user.

13. The system of claim 10 further comprising rendering one or more indicia of safety into the shared immersive virtual environment to alert users as to potential unintended contact with real objects in the shared real-world environment.

14. The system of claim 10 further comprising detecting one or more gesture-based commands performed by one or more of the users for use in interacting with one or more virtual elements mapped and rendered into the shared immersive virtual environment.

15. A computer-readable storage device having computer executable instructions stored therein, said instructions causing a computing device to execute a method comprising:
    applying one or more sensors to capture real-time tracking information of users, non-participant persons, and objects in a shared real-world environment;
    applying the tracking information to generate a real-time environmental model of the real-world environment;
    applying the tracking information to generate a real-time position and skeleton model for each of two or more users and one or more of the non-participant persons;
    generating frames of a shared immersive virtual environment that are tailored to corresponding real-time field of view of each user;
    applying the real-time environmental model and the real-time position and skeleton models to render virtual representations of one or more non-participant persons into the shared immersive virtual environment in positions corresponding to a real-world position of each non-participant person; and
    presenting one or more of the virtual representations of one or more non-participant persons as a translucent rendering that increases in solidity whenever it is determined that the non-participant person is speaking to any user.

16. The computer-readable storage device of claim 15 further comprising rendering one or more indicia of safety into the shared immersive virtual environment to alert users as to potential unintended contact with real objects in the shared real-world environment.

17. The computer-readable storage device of claim 15 further comprising detecting one or more gesture-based commands performed by one or more of the users for use in interacting with one or more virtual elements mapped and rendered into the shared immersive virtual environment.

* * * * *